US010093575B2

(12) United States Patent
Niessner et al.

(10) Patent No.: US 10,093,575 B2
(45) Date of Patent: Oct. 9, 2018

(54) CONTINUOUS PRODUCTION OF PHOTO-SENSITIVE GLASS BODIES

(71) Applicant: SCHOTT AG, Mainz (DE)

(72) Inventors: Lothar Niessner, Duingen (DE); Martin Feichtinger, Delligsen (DE); Carsten Renz, Eschershausen (DE); Bianca Schreder, Sulzbach (DE); Sean Qian, Shanghai (CN); Junming Xue, Shanghai (CN)

(73) Assignee: SCHOTT AG, Mainz (DE)

(*) Notice: Subject to any disclaimer, the term of this patent is extended or adjusted under 35 U.S.C. 154(b) by 0 days.

(21) Appl. No.: 15/158,204

(22) Filed: May 18, 2016

(65) Prior Publication Data

US 2016/0340229 A1 Nov. 24, 2016

(30) Foreign Application Priority Data

May 18, 2015 (DE) .................. 10 2015 107 779
Feb. 4, 2016 (DE) .................. 10 2016 101 992

(51) Int. Cl.
C03C 4/04 (2006.01)
C03B 11/12 (2006.01)
(Continued)

(52) U.S. Cl.
CPC ............ C03C 4/04 (2013.01); C03B 11/00 (2013.01); C03B 11/125 (2013.01); C03B 32/00 (2013.01);
(Continued)

(58) Field of Classification Search
CPC ............ C03C 4/04; C03C 3/095; C03C 15/00; C03C 23/002; C03B 11/00; C03B 11/125; C03B 32/00
See application file for complete search history.

(56) References Cited

U.S. PATENT DOCUMENTS 2,971,853 A 2/1961 Stookey
3,161,528 A 12/1964 Eppler
(Continued)

FOREIGN PATENT DOCUMENTS

DE 1696473 B1 8/1970
DE 10304382 A1 8/2004
(Continued)

OTHER PUBLICATIONS

Japanese Office Action dated Apr. 10, 2017 from corresponding Japanese Patent Application No. 2016-099891, 12 pages.

Primary Examiner — Jodi C Franklin
(74) Attorney, Agent, or Firm — Ohlandt, Greeley, Ruggiero & Perle, L.L.P.

(57) ABSTRACT

A method for continuous production of photo-sensitive glass bodies, glass bodies, and structured glass articles are provided. The glass bodies include a glass having $Si^{4+}$, at least one crystal-agonist, at least one crystal-antagonist, and at least one pair of nucleating agents. The glass may be used in a method for structuring of glass. The glass bodies may be structured and/or unstructured and used in different applications such as in components or as components in micro-technology, in micro-reaction-technology, in electronic packaging, for micro-fluidic components, in or as FED spacer, for bio-technology (for example titer plates), as interposer, and in or as three-dimensional structurable antennae.

10 Claims, 6 Drawing Sheets

(51) Int. Cl.
  *C03C 23/00* (2006.01)
  *C03B 11/00* (2006.01)
  *C03C 3/095* (2006.01)
  *C03B 32/00* (2006.01)
  *C03B 5/193* (2006.01)
(52) U.S. Cl.
  CPC ............ *C03C 3/095* (2013.01); *C03C 23/002* (2013.01); *C03B 5/193* (2013.01)

(56) References Cited

U.S. PATENT DOCUMENTS

| | | | |
|---|---|---|---|
| 3,635,687 A | 1/1972 | Dunlap et al. | |
| 4,309,217 A * | 1/1982 | Beall | C03C 3/083 501/13 |
| 4,703,019 A * | 10/1987 | Abe | C03C 3/062 501/13 |
| 6,118,599 A * | 9/2000 | Spinali | G02B 7/028 359/819 |
| 7,231,786 B2 | 6/2007 | Cimo et al. | |
| 8,062,753 B2 * | 11/2011 | Schreder | B29D 11/00 428/221 |
| 8,557,150 B2 * | 10/2013 | Ritzberger | A61K 6/0215 264/16 |
| 9,371,249 B2 * | 6/2016 | Ritzberger | A61K 6/0085 |
| 2004/0180773 A1 | 9/2004 | Schreder et al. | |
| 2005/0098064 A1 * | 5/2005 | Schweiger | C03C 10/0027 106/35 |
| 2007/0042889 A1 * | 2/2007 | Apel | C03B 32/02 501/5 |
| 2008/0248250 A1 | 10/2008 | Flemming et al. | |
| 2008/0299501 A1 | 12/2008 | Borrelli et al. | |
| 2010/0075180 A1 * | 3/2010 | Ueda | G11B 5/8404 428/846.9 |
| 2011/0195360 A1 | 8/2011 | Flemming et al. | |
| 2011/0217657 A1 * | 9/2011 | Flemming | G03F 7/004 430/270.1 |
| 2013/0276880 A1 | 10/2013 | Wolff et al. | |
| 2014/0249016 A1 * | 9/2014 | Durschang | A61K 6/024 501/32 |
| 2016/0152505 A1 * | 6/2016 | Fushie | C03B 11/08 65/33.1 |
| 2016/0185653 A1 * | 6/2016 | Fushie | C04B 35/16 428/131 |
| 2016/0194240 A1 * | 7/2016 | Fushie | C03C 15/00 430/270.1 |
| 2016/0340230 A1 * | 11/2016 | Beall | C03C 3/112 |

FOREIGN PATENT DOCUMENTS

| | | | |
|---|---|---|---|
| DE | 102005003595 A1 | 7/2006 | |
| DE | 102008002104 A1 | 12/2008 | |
| DE | 102010042945 A1 | 4/2012 | |
| JP | 2003-226548 A | 8/2003 | |
| WO | 2005/033033 A1 | 4/2005 | |
| WO | 2015/019989 A1 | 2/2015 | |
| WO | WO-2015033826 A1 * | 3/2015 | ............ C04B 35/16 |

* cited by examiner

CONTINUOUS PRODUCTION OF PHOTO-SENSITIVE GLASS BODIES

CROSS REFERENCE TO RELATED APPLICATIONS

This application claims benefit under 35 U.S.C. § 119(a) of German Patent Application No. 102015107777.9 filed on May 18, 2015 and of German Patent Application No. 102016101992.5 filed Feb. 4, 2016, the entire contents of both of which are incorporated herein by reference.

BACKGROUND

1. Field of the Invention

The present invention relates to a method for continuous production of photo-sensitive glass bodies. The glass bodies consist of photo-structurable glass.

2. Description of Related Art

Methods of continuous production of glass bodies are known to the skilled person from the prior art. They are suitable for producing continuously pressed glass bodies that are usable in different applications from a glass melt by pouring the melt into a mold.

In a pressing process, a glass melt is casted into a mold, which generally consists of metal. Depending on the size of the mold, the glass cools down with different speeds. This is a process that may result in crystal formation in crystallization-sensitive glass, particularly if the cooling of the glass takes too long, which is a problem especially at comparably large geometries. Due to crystallization the glass becomes unusable. Consequently, methods of continuous pressing have been applied so far only to technical glasses, which are not particularly crystallization-sensitive, and to particularly crystallization-resistant optical glasses.

It has to be differentiated between unwanted crystallization in glass production as described above, which is also called "devitrification", and directed crystallization, which can be achieved in photo-structurable glasses by light exposure and tempering. It is indeed a crystallization process in each case, however, the processes differ with regard to the occurring crystals. While alkali disilicates are formed in devitrification, alkali metasilicate crystals are generated in directed crystallization in photo-structurable glasses. Despite the described differences with regard to the processes underlying crystallization, photo-structurable glasses also have an increased tendency to devitrification in addition to the tendency to crystal formation induced by exposure to light and tempering desired for photo-structurability.

Photo-structurable glasses are generally characterized by a pronounced crystallization tendency, which is desired for structuring. For example, these glasses contain nucleating agents, which form metal nuclei upon directed UV-irradiation of defined areas of a glass body. The following reaction equation exemplarily illustrates this event for silver as nucleating agent.

$$Ce^{3+} + Ag^+ + h\nu \rightarrow Ce^{4+} + Ag^0 \quad \text{(Equation 1)}$$

Upon irradiation of photo-sensitive glasses with UV-light at a wavelength of about 320 nm, trivalent cerium yields an electron to the silver ion, whereby elemental silver is generated. In a subsequent tempering step the desired crystal nuclei are formed around the generated atomic silver.

It is a challenge for producers of photo-sensitive glass to adjust a good balance between the desired crystallizability after production and the critical crystallization tendency, which complicates the production. For example, increase of the applied amount of silver results in formation of elemental silver already during melting. This precipitates and may result in silver bubbles or silver droplets, whereby the production is complicated or even becomes impossible.

Furthermore, production of photo-structurable glass is also particularly challenging for the reason that the components cerium and silver, respectively, have to be present in the correct oxidation state in the final glass so that the reaction as described above (Equation 1) can take place. Of course, an oxidizing melting procedure results in prevention of precipitation of silver during melting because reduction to metallic silver does not occur. However, in such a case, cerium is present in its tetravalent form in the glass so that the desired reaction (Equation 1) cannot take place upon exposure to UV-light.

On the other hand, if a reducing melting procedure is selected, for increasing the amount of trivalent cerium, the risk is increased that elemental silver is formed already during production. Silver nuclei in unexposed glass disturb selective crystallization of the glass by tempering because also unexposed areas would crystallize. Moreover, the glass would not fulfill the transmittance requirements. Rather, it is desired that no elemental silver is formed during production so that essentially the entire silver in the glass is available as monovalent silver ions for the reaction of Equation 1.

In addition to the pair of nucleating agents, which generally represents only a very small proportion of the glass, the remaining composition of the glass is of course also contributing to crystallization sensitivity. The attention of the developers of such glasses has so far been more directed to increasing the crystallization tendency onto a level necessary for subsequent structuring. Therefore, manufacturing of photo-structurable glasses in continuous pressing methods was not considered so far.

However, it would be desirable to have a glass, which can be produced in a continuous pressing method. The so obtained glass body could then be exposed to light and be structured.

SUMMARY

It is therefore an object of the present invention to provide a method with which a photo-structurable glass body can be produced in a continuous pressing method without having inferior properties with regard to crystallizability and photo-sensitivity as compared to the glasses of the prior art.

This object is solved according to the present invention on the one hand by selecting a glass, which is manufacturable in such a way, and on the other hand by adapting the pressing method to the glass as defined herein.

The method of the present invention for production of a photo-sensitive glass body comprises the steps of: Providing a mixture of raw materials for the desired glass, particularly inside a melting vessel, Melting the mixture, particularly inside the vessel, Transferring the melt into a mold, Pressing the glass to a glass body in the mold, wherein the melt at the time of transferring it into the mold has a temperature, which is above 1000° C., wherein the melt cools down in the mold in such a way that the temperature range of 990° C. to 600° C. is passed through in a time span of less than 15 minutes and wherein the glass comprises $Si^{4+}$, at least one crystal-agonist, at least one crystal-antagonist and at least one pair of nucleating agents, wherein the crystal-agonists are selected from $Na^+$, $K^+$, and $Li^+$, wherein the crystal-antagonists are selected from $Al^{3+}$, $B^{3+}$, $Zn^{2+}$, $Sn^{2+}$ and $Sb^{3+}$, wherein the pair of nucleating agents comprises cerium and at least one agent from the group of silver, gold and copper, wherein the molar proportion of the crystal-agonists in cat.-% in relation to the molar proportion of $Si^{4+}$ is at least 0.3 and at most 0.85.

In a preferred embodiment of the method, subsequent to the melting and/or transferring the glass is subjected to a sensitization step, which corresponds to a cooling from a temperature T1 to a temperature T2 with an average cooling rate K of at most 200° C./h, wherein temperature T1 is at least above the glass transition temperature $T_g$ of the glass and temperature T2 is at least 150° C. below T1. In a particular preferred embodiment, T1 is 100° C. above the glass transition temperature $T_g$ of the glass and temperature T2 is 250° C. below T1. In another preferred embodiment, T1 is 50° C. above the glass transition temperature $T_g$ of the glass and temperature T2 is 200° C. below T1. In another preferred embodiment, T1 is 25° C. above the glass transition temperature $T_g$ of the glass and temperature T2 is 150° C. below T1.

Preferably, cooling from the temperature T1 to the temperature T2 occurs steadily. "Steadily" means in this context that the glass is cooled continuously from T1 to T2 without the glass being kept on certain temperature levels. In particular, cooling with essentially constant cooling rate is meant therewith. Preferably, maximum and minimum cooling rate during cooling from the temperature T1 to the temperature T2 deviate from the average cooling rate K by at most ±20%, more preferably by at most ±15%, more preferably by at most ±10%, more preferably by at most ±5%, respectively.

DETAILED DESCRIPTION

Subject of the invention is also a pressed glass body, which is producible with a method of the present invention.

Subject of the invention is also a glass body of sensitized, photo-structurable glass comprising $Si^{4+}$, one or more crystal-agonists, one or more crystal-antagonists and at least one pair of nucleating agents wherein the crystal-agonists are selected from $Na^+$, $K^+$ and $Li^+$, wherein the crystal antagonists are selected from $Al^{3+}$, $B^{3+}$, $Zn^{2+}$, $Sn^{2+}$ and $Sb^{3+}$, wherein the pair of nucleating agents comprises cerium and at least one agent from the group silver, gold and copper, wherein the molar proportion of the crystal-agonists in cat.-% in relation to the molar proportion of $Si^{4+}$ is at least 0.3 and at most 0.85 and the glass has a cooling state that corresponds to a steady cooling from a temperature T1 to a temperature T2 with a cooling rate K of at most 200° C./h, wherein temperature T1 is at least above the glass transition temperature $T_g$ of the glass and temperature T2 is at least 150° C. below T1. "Steady" means in this context that it is cooled down continuously from T1 to T2 without the glass being kept on certain temperature levels. In particular, cooling with essentially constant cooling rate is meant therewith. As far as it is cooled to room temperature after cooling to T2, also this further cooling can occur steadily, but further cooling below T2 is not decisive. Room temperature is preferably 20° C.

Figure 1:
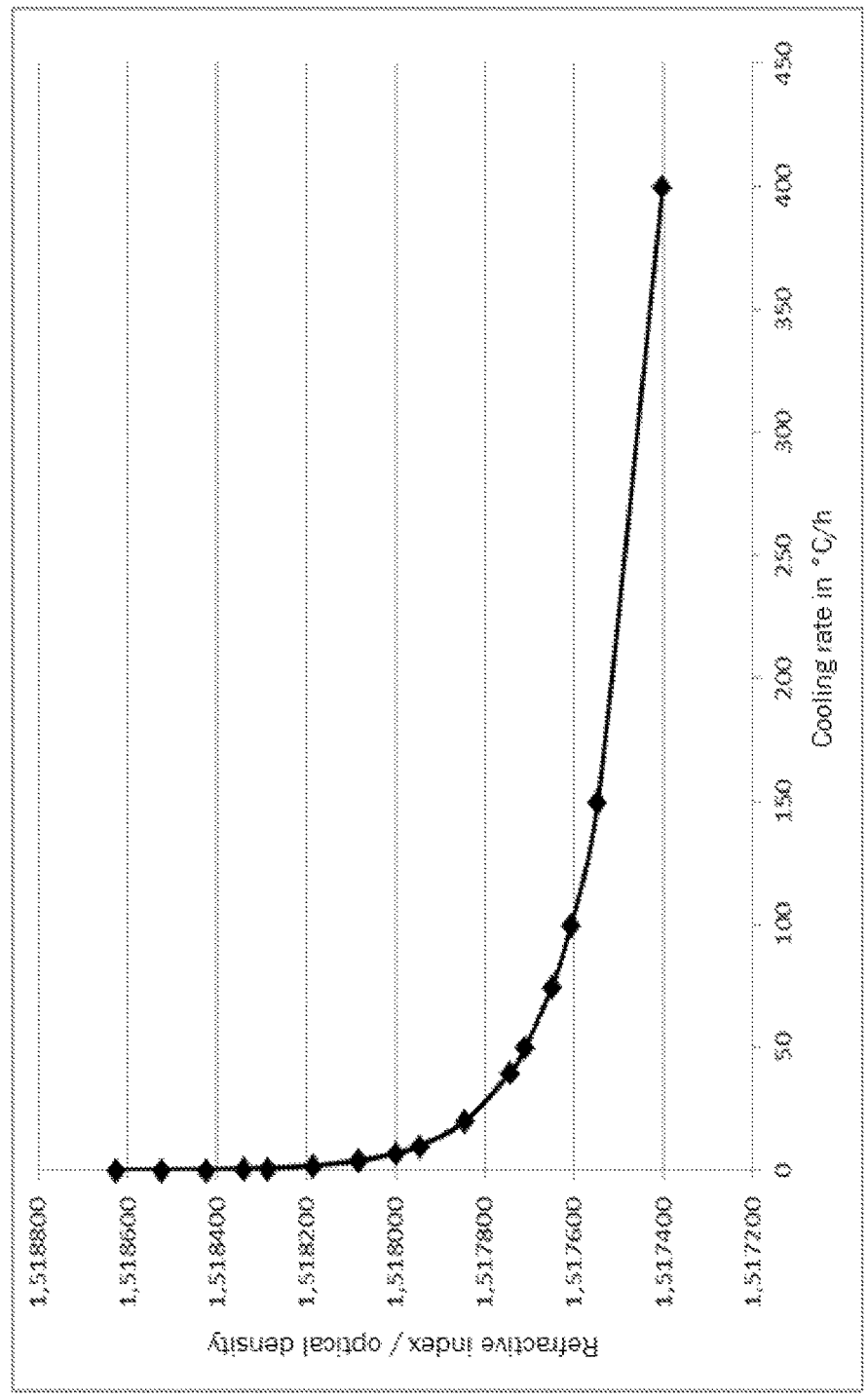
FIG. 1 shows the cooling curve of glass B1.
Figure 2:
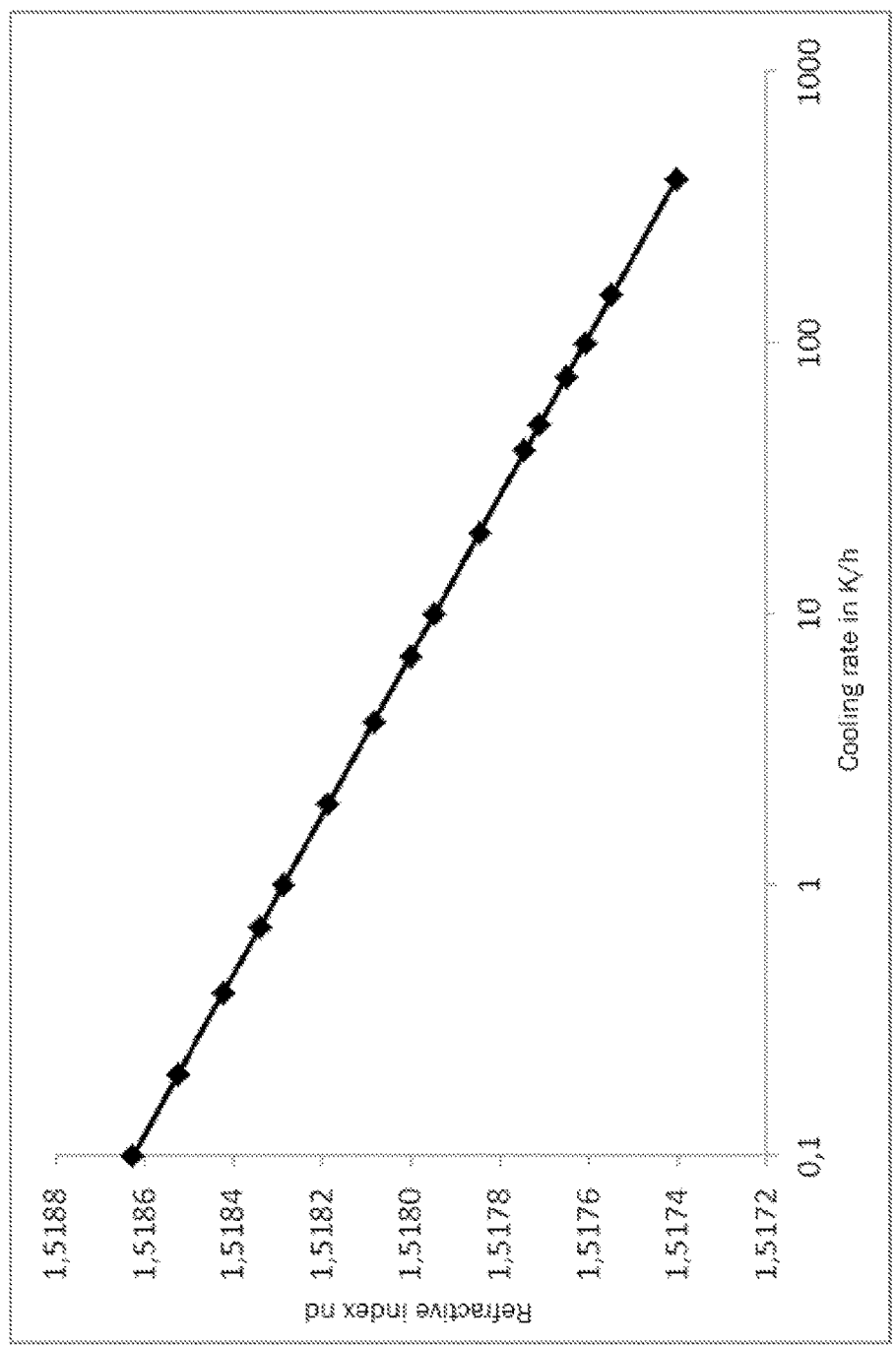
FIG. 2 shows a cooling curve with logarithmically plotted x-axis.

The cooling state of a glass can be determined on a given glass also without knowledge of the manufacturing conditions. For determining the cooling state of a glass sample P, initially its refractive index $n_d$ and/or its mass density p are determined. The sample is then preferably divided into several individual samples P1, P2, P3 and so on. Each sample is then heated to temperature T1 and subsequently cooled down to temperature T2 with different cooling rate K1, K2, K3 and so on. After cooling to temperature T2 and preferably further cooling to room temperature, index of refraction $n_d$ and/or mass density p are determined again so that each of the values can be assigned to a cooling rate. The obtained pairs of values can then be plotted in a coordinate system, wherein the ordinate represents the density values and the abscissa represents the cooling rate. Based on the so obtained cooling curve a conclusion can be drawn from the density of the glass sample P to the cooling state thereof. The correlation between cooling rate and refractive index is shown in FIG. 1 for an example glass. In case the x-axis is plotted logarithmically, the correlation arises from a simple linear equation. An example thereof is shown in FIG. 2.

The terms refractive index and index of refraction are used synonymously in the present description.

The cooling state of a glass is thus a measure for the conditions during the cooling of the glass. A conventionally "quenched" glass, which was cooled very fast from the melt (for example >>300° C./h), has a high cooling state. The ions in such a glass are "frozen" in a comparably disordered state. So to speak, by fast cooling from the melt, the glass is thus "frozen" on a high energy level. The high temperature ranges, in which a spatial approaching of the crystal components (crystal-agonists, $Si^{4+}$) was still possible due to low viscosity, was passed through fast. Therefore, a fast cooled glass, which is on a high cooling state, has a comparably low density or index of refraction. The differences of the index of refraction of a glass in dependence from its cooling state are comparably low. However, because these properties can be measured reliably up to the sixth decimal place, this method is nevertheless suitable for providing a reliable measuring result. Experiments have shown that the sensitizing of glass as described herein causes an increase in refractive index at least in the fifth, preferably even in the fourth decimal place.

The cooling state according to the present invention is preferably adjusted by subjecting the glasses of this invention to a sensitization step as described herein. This sensitization step is described further below. If herein a sensitization step is mentioned, this always means a treatment step, which occurs prior to light exposure of the glass. The heat treatment step after light exposure of the glass is herein called "tempering" in accordance with the literature.

The inventors think that it is probable that for the better crystallizability of glass bodies sensitized according to the present invention there are a plurality of reasons, which result from the complex interplay of glass composition and sensitization or production method. Thereby it is probable that an approaching of the crystal components is reached by the sensitization. This approaching could be enabled by the glass being in a viscosity range, which allows diffusion of the crystal-agonists in the network, for a comparably long time span (in comparison to cooling by quenching) during cooling from T1 to T2. Thereby the glass approaches the crystalline state, however, without crystallizing. So to speak, it is more sensitive for the desired crystallization after a UV-exposure.

In addition, a sensitized glass has a more close-meshed glass structure due to its higher density. This could be the reason for the particularly small crystals forming in the crystallized glass. Finally, crystal-agonists, whose mobility is important for crystallization, cannot as easily move by diffusion in a close-meshed structure as in a comparable coarser network. Thereby crystal growth should be hindered in the sensitized glass so that crystals may indeed be formed around the generated nuclei, however, their growth and thus the association of several crystals to larger crystals is hindered. The result are fine crystal arrangements that allow etching of particularly fine structures.

Furthermore, it turned out that due to the sensitization the self-absorption of the glass matrix (band edge) in the important UV-region around the absorption maximum of $Ce^{3+}$ is shifted in the direction of smaller wave-lengths. Thereby the absorption in this region is overall smaller and the UV-light, which is used for irradiation, can enter deeper into the glass and can achieve a deeper structure depth. The results shown in FIG. 3 prove the increase in transmittance in the UV-region achieved by sensitization.

In accordance with the invention is thus a glass body having a cooling state, which corresponds to a comparably low cooling rate. Prior art glasses are cooled with high cooling rate for keeping the crystallization risk down. In contrast, the glass bodies of the invention have been cooled by the preferred sensitization in such a way, either directly from the melt or in a subsequent step following the melt and if applicable following hot forming, that a cooling state of at most 200° C./h is reached. Preferably, the cooling state is even below 150° C./h, more preferably below 120° C./h, more preferably below 100° C./h or below 85° C./h. In a preferred embodiment, the cooling state can even be below 80° C./h.

However, it has to be considered that due to the circumstances described above (ion mobility, crystal formation)—dependent on the glass composition—a certain cooling state should not be undercut. At a very slow cooling, the glass may stay in a temperature range, which enables crystal formation, for too long. Then crystallization would occur. It turned out to be advantageous, not to undercut a cooling state of 10° C./h, more preferably 20° C./h, particularly preferably 40° C./h and more preferably 60° C./h for not risking crystallization. This does not exclude that certain glass compositions tolerate even such a low cooling state.

The term "cooling state of X° C./h" indicates a cooling state that corresponds to a cooling from a temperature T1 to a temperature T2 with a steady cooling rate K of at most X° C./h. It has to be noted that the indication of a "cooling state that corresponds to a cooling from a temperature T1 to a temperature T2 with a steady cooling rate K of at most X° C./h" does not mean that the so characterized glass or the so characterized glass body was in fact cooled with such a steady cooling rate from T1 to T2. Rather, it is meant that the glass or the glass body has the same cooling state as such a glass. The glass body of the invention could also have been cooled from a temperature T1 with a cooling rate K' to a temperature T1' and then with a cooling rate K" to a temperature T2. Crucial is the obtained cooling state, which is indicated as defined in here for ensuring clarity and measurability.

In the glass body of the present invention, alkali metasilicate crystals are formed upon tempering after light exposure. Metasilicates are characterized by a stoichiometry, which has one mole crystal-agonists, for example an alkali metal oxide as $Li_2O$ or $Na_2O$, per mole of silicon dioxide ($SiO_2$). Thus, the stoichiometric ratio of alkali metal ions to silicon ions in the metasilicate is 2:1. If both components, alkali metal oxide and silicon dioxide, in this stoichiometric ratio of the crystal were together melted and cooled down, no glass would be formed but a ceramic.

In order to obtain a glass and not a ceramic, according to the invention on the one hand the glass composition substantially deviates from this crystal stoichiometry and on the other hand crystal-antagonists are used for decreasing the crystallization tendency of the glasses.

According to the invention, "glass" is understood as an essentially amorphous material and "ceramic" as an essentially completely crystalline material. A material that contains both crystalline and amorphous phases is called "glass-ceramic".

It turned out to be advantageous to select the stoichiometry of crystal-agonists and silicon in form of $Si^{4+}$ in such a way that the molar ratio in cat.-% of crystal-agonists to $Si^{4+}$ in the glass is at least 0.3, more preferably at least 0.5 and further preferably at least 0.55. However, this ratio should preferably not exceed a value of 0.85, more preferably of 0.7, particularly preferable is a ratio of at most 0.65. If namely with respect to $Si^{4+}$ a too low amount of crystal-agonists is used, then the composition departs too far from the desired stoichiometry and the crystallization tendency is strongly reduced. Crystallizing such a glass would be lengthy and energy-intensive. Furthermore, mostly disilicates would be formed, which do not show such a substantial solubility difference in comparison to glass with regard to common etching solutions as the desired metasilicates. A too high amount of crystal-agonists, however, would increase the crystallization tendency strongly due to approaching the stoichiometry of the metasilicate and would complicate or make impossible the processability.

A glass melt has a very high temperature, which is well above temperature ranges, in which crystals or nuclei may form. For example, the glass used according to the invention for the glass body is melted at temperatures that are preferably above 1300° C., more preferably above 1400° C. Such a temperature assures that all components are melted. Preferably, a temperature of 1800° C., more preferably 1700° C. and particularly preferably 1600° C. should however not be exceeded because too high temperatures favor the reduction of silver in the glass and additionally the energy demand is thereby strongly increased. Only upon cooling of the glass melt after the production, the crystallization tendency increases until the viscosity of the melt is so high that no more nuclei can be formed. The reason is that diffusion of crystal components is restricted with increasing viscosity. For this reason, crystallization-susceptible glasses have to be cooled fast enough. When it is cooled too slowly, the thermodynamically preferred crystal phase is formed and no glass is obtained, but a glass-ceramic. This mostly applies also to the glass of the present invention with the exception that preferably a sensitization takes place, either by cooling the melt in the temperature range from T1 to T2 comparably slowly or by initial fast cooling from the melt and then a slow cooling from T1 to T2 in a subsequent sensitization step.

By fast cooling from the melt the glass is so to say "frozen" on a high energy level. Just due to the high viscosity of the glass it is not transformed into the energetically more favorable crystal state. This is also the reason why photo-sensitive glasses are tempered after irradiation. Otherwise, neither the temperature necessary for nuclei formation ("nuclei forming temperature") would be achieved in the irradiated photo-sensitive glasses nor the higher "crystal growth temperature". Both temperatures represent temperature ranges. The prior irradiation ensures that in the tempering step crystallization of specifically the irradiated areas can be achieved. Thereby in interaction with the higher etchability of the crystallized areas, directed introduction of structures in the subsequent etching step is enabled.

Glasses, which already have an extremely high devitrification tendency due to their composition or due to the process management, have to be cooled down from the melt very fast. Thereby the viscosity of the melt increases so fast that no crystallization occurs. A glass is obtained, which is "frozen" on a high cooling state. Such a glass may be well suitable for photo-structuring due to the correlation between devitrification tendency and the tendency to crystal formation induced by light exposure and tempering as described above. The desired crystals are formed fast upon tempering after light exposure. However, such a glass can be post-processed only with relatively cost-intensive processes. A priori most processes are excluded, in which the glass has to be re-warmed. Eventually in re-warming nothing else happens than in tempering: diffusion of ions, in particular of small alkali metal ions, increases and nuclei and crystals are formed. Consequently, such glasses, which inherently are particularly devitrification-susceptible, can only be post-processed coldly. A hot post-processing (for example re-drawing) is out of question. The same applies for hot forming steps directly from the melt (for example pressing, floating, rolling, out-rolling, down draw, overflow fusion). Glasses with such extremely high devitrification tendency are not subject of the present invention.

The present invention uses glasses, which indeed have a pronounced crystallization tendency so that they can be photo-structured, which however do not show extremely high devitrification tendency. This is achieved by the process management and/or by the composition of the glasses. For instance, the glasses significantly deviate from the metasilicate stoichiometry, furthermore they are preferably melted in a comparably oxidizing way.

Thereby it is achieved that the pair of nucleating agents (for example cerium and silver) present in the glass is present with regard to the nuclei-source (in particular Ag) mostly in higher oxidation states. Thereby also a higher proportion of cerium will be present in the oxidation state $Ce^{4+}$ than would be the case in a more reducing melt. In the prior art this constellation is described as undesired because as much $Ce^{3+}$ must be present as possible for nuclei formation according to the reaction described above (Equation 1). However, according to the invention this is wanted for conferring the glass with a slightly lower crystallization tendency directly after the melt. According to the invention, only later—after the melting but prior to the light exposure—the ratio of $Ce^{3+}$ to $Ce^{4+}$ is shifted more towards $Ce^{3+}$ by the sensitization. The ratio of both oxidation states of cerium can unfortunately not be determined in the glass. Namely, decomposition of the glass is changing the oxidation state and the transmittance bands of $Ce^{4+}$ are in a wavelength region, in which the glass itself is strongly absorbing.

A preferred comparably oxidizing melting procedure has the advantage that the glasses may be subjected to one or more hot processing steps directly after the melt or at a later time point, in any case however prior to light exposure and in particular also prior to sensitization. The method of the present invention includes such a hot processing step. The pair of nucleating agents is so to say restricted in its activity at the time point of hot processing due to the presence of $Ce^{4+}$. However, without nuclei no crystals are formed. The glass or the melt are thus in a comparably uncritical state with regard to crystallization.

According to the invention, pressing is used as hot processing step, which preferably takes place prior to light exposure and tempering. This hot processing method is well known from the prior art. It can be performed as known with the glass used herein, however with the proviso that the melt has to be cooled relatively fast through the temperature range from 990° C. to 600° C., in particular to 460° C. T1 is preferably below 600° C. so that a fast passing through the indicated temperature range preferably allows for a directly subsequent sensitization. Namely, in this temperature range the crystallization risk is substantial even for the glass used herein. The indicated temperature range should therefore be passed through in not more than 15 minutes, more preferably not more than 10 minutes, more preferably not more than 5 minutes and particularly preferably not more than 3 minutes.

A crucial aspect, which is responsible for the substantial but moderate crystallization tendency of the present glass bodies, is their composition. This invention is based to a large degree on the correct adjustment of the molar ratios of the cations to each other (crystal stoichiometry). Therefore, it is reasonable to characterize the glass composition by indications in cat.-%. Of course the glass also comprises anions, which shall also be described below. However, they are less formative for the properties of the glass than the cations so that the core of the invention is more in the cation composition.

The term "cation percent" (abbreviated "cat.-%") relates to the relative molar proportions of the cations with regard to the total amount of cations in the glass. Of course the glass also comprises anions, whose relative molar proportions in relation to the total amount of anions in the glass is herein indicated as "anion percent" (abbreviated "anion-%").

As described at the beginning, the glass used according to the present invention comprises $Si^{4+}$ in any case. This component is added to the melt preferably in form of $SiO_2$ (sand). $Si^{4+}$ is crucial for the glass properties and for the crystallization behavior because it is a key component of the alkali metasilicate crystal. The stoichiometry of the alkali metasilicate crystal is shown subsequently:

$R_2O_3Si$ R=alkali metal ion.

In a preferred embodiment the glass comprises silicon ($Si^{4+}$) in an amount of at least 45 cat.-%, further preferred at least 50 cat.-%, more preferred at least 52 cat.-% and particularly preferred at least 56 cat.-%. The content of this component should not exceed a value of at most 65 cat.-%, further preferred at most 63 cat.-%, further preferred at most 61 cat.-% and particularly preferred at most 60.5 cat.-%. The amount of this component has to be considered because a too low amount of silicon can impair the crystallization tendency too strongly. Very small amounts of silicon would even result an increase of crystallization tendency in such a way that no glass is obtained at all. Furthermore, silicon is an important glass former, which critically co-determines the glass network. If however too much silicon is added, the glass network becomes denser. This restricts the ion mobility in the glass and prevents the diffusion in particular of alkali metal ions so that crystal formation would be prevented.

The selection of the right amount of silicon is comparably complex because not only the proportion of silicon is alone decisive but also the proportions of $Al^{3+}$ and $B^{3+}$ as well as the ratio of alkali metal ions to silicon play a role. According to the invention, the molar ratio of alkali metal ions to the molar proportion of silicon is at least 0.3 to at most 0.85. Preferably, this ratio should be at least 0.4 and at most 0.8, more preferably at least 0.5 and at most 0.75 and particularly preferably at least 0.6 and at most 0.7.

Consequently, also the proportion of crystal-agonists in the glass plays a role. According to the invention, the crystal-agonists are preferably selected from the cations of lithium ($Li^+$), sodium ($Na^+$) and potassium ($K^+$). Preferably, the glass contains all three components $Li^+$, $Na^+$ and $K^+$. The total amount of these components should preferably be at least 30 cat.-%, further preferably at least 32 cat.-% and more preferably at least 34 cat.-%. However, an amount of 45 cat.-%, further preferred 43 cat.-%, more preferred 40 cat.-% or 38 cat.-% should not be exceeded. A too large amount of these components would on the one hand very strongly increase the crystallization tendency of the glass and would on the other hand strongly reduce the chemical resistance of the glass. At a too low amount of these components the crystallization tendency would be strongly reduced because this would inherently result in a larger deviation from the metasilicate stoichiometry.

However, not only the total amount of crystal-agonists is relevant but also the content of the respective individual components and their ratios to each other. The glass preferably comprises lithium in an amount, which exceeds the molar amounts of each of sodium and potassium. Preferably, the content of lithium also exceeds the content of the sum of potassium and sodium in the glass. With other words, preferably lithium is the main component among the crystal-agonists. The amount of lithium in the glass of the invention is preferably at least 20 cat.-%, further preferably at least 25 cat.-%, more preferably at least 27.5 cat.-% and particularly preferably at least 28 cat.-%. The content should preferably be at most 40 cat.-%, further preferably at most 35 cat.-% and particularly preferably at most 32 cat.-%. The ratio of lithium to silicon should preferably be at least 0.4 and more preferred at least 0.45. In particular, this value is at most 0.7, further preferably at most 0.65, more preferably at most 0.6 and particularly preferably at most 0.55.

Because lithium is preferably the main component among the crystal-agonists, with regard to advantages and disadvantages of the indicated ratios of lithium to silicon the same applies as described above for the ratio of crystal-agonists to silicon. Lithium is preferably the main component among the crystal-agonists according to the invention because lithium is particularly mobile since it is the smallest cation of the alkali metals. This facilitates diffusion of lithium in comparison to the other alkali metals and enables sensitization of the glass at comparably low temperatures and comparably fast.

Indeed lithium is preferably the main component of the crystal-agonists in the glass and thus exceeds with regard to the molar proportion the proportions of the components sodium and potassium. Nevertheless, the glass preferably also contains the components potassium and/or sodium in addition to lithium. Thereby it is preferred that the component potassium exceeds the component sodium in its molar proportion. It has turned out that thereby the tendency of the glass to build the desired metasilicate crystals after light exposure is increased. A too high amount of sodium in relation to potassium would favor crystal formation in favor of the disilicates. Potassium may improve the chemical resistance of the glass when used in small amounts. Furthermore, potassium reduces the devitrification tendency of the glass at the production. The content of potassium in the glass should preferably be at least 2 cat.-%, further preferably at least 2.5 cat.-%, more preferably at least 3 cat.-% and particularly preferably at least 3.5 cat.-%. However, the content of this component should preferably be at most 8 cat.-%, further preferably at most 7 cat.-%, more preferably at most 6 cat.-% and particularly preferably at most 5 cat.-%.

According to the invention, the component sodium should preferably be present in a proportion of at least 1 cat.-%, further preferably at least 1.5 cat.-%, more preferably at least 2 cat.-% in the glass. Preferably, a content of at most 5 cat.-%, further preferably at most 4 cat.-% should not be exceeded. In a particularly preferred embodiment, the content of sodium in the glass does not exceed a value of 3 cat.-%. This ensures that the formation of disilicates is mostly prevented.

As mentioned in the beginning, the glasses do not only contain silicon and crystal-agonists but also at least one agent from the group of crystal-antagonists. According to the invention, preferred crystal-antagonists are aluminum ($Al^{3+}$), boron ($B^{3+}$) and zinc ($Zn^{2+}$) as well as tin ($Sn^{2+}$) and antimony ($Sb^{3+}$). The crystal-antagonists serve for inhibiting formation of crystals or nuclei. If no crystal-antagonists were added, the glass would crystallize very fast. Potentially, no glass would be obtained at all. According to the present invention, the content of the crystal-antagonists should preferably be at least 2 cat.-%, more preferably at least 2.5 cat.-%, particularly preferably at least 3.5 cat.-%. For not inhibiting crystal formation too much, the content of the crystal-antagonists is preferably restricted to at most 9 cat.-%, further preferred are at most 8 cat.-% and more preferably at most 7.5 cat.-%. In particularly preferred embodiments, the content is restricted to at most 5.5 cat.-%.

Among the crystal-antagonists aluminum is preferably the main component, which means that the component aluminum is present in the glass with regard to the molar amounts in a higher proportion than the remaining crystal-antagonists, in particular than the components boron and zinc. This has the advantage that aluminum does not hinder the formation of metasilicates when it is used in limited amounts. For this purpose, according to the present invention preferably at least 2 cat.-%, more preferably at least 3 cat.-% and particularly preferably at least 3.5 cat.-% aluminum are used. Aluminum decreases the devitrification sensitivity. However, the amount of aluminum used should also not be too high because this on the other hand could lead to formation of spodumene mixed crystals. Furthermore, aluminum increases the melting point of the glass, which has to be balanced by use of larger amounts of alkali ions. For this reason, the component aluminum should be used in amounts that preferably do not exceed 8 cat.-%, more preferably 7 cat.-%, further preferably 6 cat.-% and particularly preferably 5 cat.-%. In particularly preferred embodiments, the amount of aluminum is restricted to at most 4.5 cat.-%.

Because the recommendable amount of aluminum is restricted due to the risk of formation of other crystal phases, it may be necessary to use further crystal-antagonists. Thereby particularly boron and zinc come into consideration. The invention comprises both the use of glasses, which contain only boron or only zinc, as well as such glasses that comprise these both components. Therein it is preferred that the amount of boron is strongly restricted. Background is that boron shows a very strong effect on crystallization tendency. If too much boron is used, the crystallization tendency is very much decreased. For this reason boron is preferably used in amounts that do not exceed 3 cat.-%. Further preferably this component should not be used in amounts that are larger than 1.5 cat.-% and particularly preferably not larger than 0.5 cat.-%, in particular not larger than 0.35 cat.-%. A minimum amount of boron may however be advisable. According to the invention, this is preferably at least 0.05 cat.-%, further preferably at least 0.1 cat.-% and particularly preferably 0.2 cat.-%.

Zinc can serve as crystal-antagonist additionally or alternatively to boron. If both zinc and boron are used, the amount of zinc should be higher than the amount of boron with regard to the molar proportions of the cations. Preferably, the amount of zinc is even at least 1.5 times as high as the molar proportion of boron, however in particular not higher than 2.5 times as high. In preferred embodiments the glass comprises zinc in an amount of at least 0.2 cat.-%, further preferred at least 0.3 cat.-% and particularly preferred at least 0.45 cat.-%. Zinc prevents the undesired reduction of silver and thus the uncontrolled formation of nuclei by removal of terminal oxygen in the glass. However, if too much zinc is used, crystallization tendency decreases stronger than desired. Therefore, the amount of zinc should be at most 2.5 cat.-%, further preferred at most 1.5 cat.-% and particularly preferred at most 0.8 cat.-%.

In addition to the indicated components also antimony ($Sb^{3+}$) and tin ($Sn^{2+}$) may serve as crystal-antagonists. Tin and antimony serve as reducing agents, which provide for a particularly fine distribution of the nuclei-source in the glass. This effect occurs in particular at low amounts of these components. For the component tin the proportion is preferably below 0.1 cat.-%. Preferably, the glass is even free of tin.

The preferred amount of antimony in the glass is restricted to at most 0.4 cat.-%, further preferably at most 0.2 cat.-%. The inventors found out that the transmittance in the UV region is surprisingly increased at low proportions of antimony in the glass. Thereby the UV-light, which is used for irradiation, can enter deeper into the glass so that a deeper structure depth can be achieved. Thus, via the antimony-content also the extent of absorption in the UV-region and thereby the achievable depth of light exposure can be adapted independent of the cerium-content. Particularly preferably the proportion of antimony in the glass is restricted to at most 0.19 cat.-%, further preferably to at most 0.18 cat.-%, even further preferably to at most 0.17 cat.-%. The positive effects of a low antimony-content can also be inferred from the results of example 6. However, preferably at least 0.02 cat.-%, further preferably at least 0.05 cat.-%, further preferably at least 0.08 cat.-%, further preferably at least 0.09 cat.-%, further preferably at least 0.1 cat.-% and particularly preferably at least 0.15 cat.-% are used for a particularly fine distribution of the nuclei-source in the glass. In an alternative embodiment, the glass is free of antimony.

Via an advantageous selection of the antimony-content a glass may be obtained, whose transmittance value at 260 nm and a sample thickness of 1 mm is preferably at least 1.2%, further preferably at least 1.5%, further preferably at least 1.8%, further preferably at least 2%, further preferably at least 2.5%. Furthermore, when the antimony-content is advantageously selected, the light exposure time, which is necessary for achieving sufficient crystallization at a light exposure dose preferred according to the present invention is at most 15 minutes, at most 10 minutes, further preferred at most 5 minutes. Via an advantageous selection of the antimony-content according to the present invention a glass may preferably be obtained, at which upon light exposure with UV-light a light exposure depth of at least 1 mm, further preferred at most 2 mm, further preferred at most 2.5 mm, further preferred at most 3 mm, further preferred at most 4 mm, even further preferred 5 mm may be achieved.

As indicated at the beginning the glass comprises at least one pair of nucleating agents in addition to silicon, crystal-agonists and crystal-antagonists. The pair of nucleating agents on the other hand comprises a nuclei-source, which is preferably selected from silver, gold and copper as well as a reducing agent, which is cerium according to the present invention. Silver is preferred as nuclei-source. The roles that these two components play in the pair of nucleating agents can be inferred from the reaction equation exemplarily presented above for the pair of nucleating agents cerium and silver. In summary, it is about that the reducing agent reduces the cations of the nuclei-source to metal, whereby in the glass nuclei are formed, which in turn shall enable crystal formation.

It is preferred according to the invention that the amount of nuclei-source in the glass is comparably high. Background is that many small finely distributed nuclei lead to a finer crystal arrangement than a smaller number of nuclei in the same glass volume. For this reason the amount of nuclei-source in the glass, which is preferably silver ions, should have a proportion of at least 0.001 cat.-%. Further preferably this proportion is at least 0.01 cat.-%, more preferably at least 0.03 cat.-%, particularly preferably at least 0.05 cat.-%. However, if the amount of nuclei-source is chosen too high, nuclei formation or precipitation of elemental metal, respectively, possibly occurs already during melting. This has to be prevented by all means because precipitated metal droplets are firstly not available for nuclei formation in the glass and secondly the glass does not have the optical quality that is necessary. Furthermore, elemental metal droplets impair the transmittance properties of the glass for example by light scattering. Therefore, the amount of nuclei-source in the glass is preferably restricted to at most 0.5 cat.-% or at most 0.2 cat.-%, further preferred at most 0.1 cat.-% and particularly preferred at most 0.08 cat.-%. In preferred embodiments the glass is free of gold and copper.

As explained it is desirable to achieve a large number of nuclei in a given volume after light exposure. Because of the reaction equation presented above it is not sufficient for this purpose to choose the proportion of nuclei-source as high as possible. Rather it is also necessary to perform the sensitization and to adjust the proportion of cerium to the amount of nuclei-source used. According to the invention it is therefore preferred that the molar ratio of nuclei-source to cerium in the glass of the invention is at most 10, further preferred at most 7, more preferred at most 6.5 and particularly preferred at most 5.8. A larger amount of nuclei-source may increase the problems at the production without considerably improving the fine crystallinity. However, the ratio should of course not be too low so that the amount of formed nuclei is sufficient for enabling achievement of particularly fine structures in the photo-structurable glass body.

Because of the simplified process management of the glasses in comparison to the prior art the amount of cerium in the glass can be chosen comparably high. Eventually cerium will be present to a certain degree in oxidation state 4+ due to the relatively oxidizing melting procedure. Thereby the undesired nuclei formation is suppressed during the manufacturing to a certain degree. At the same time, just as the amount of cerium, the amount of nuclei-source can be chosen relatively high for achieving a fine crystal arrangement, which in turn enables a particularly fine structuring.

The amount of cerium (as sum of $Ce^{3+}$ and $Ce^{4+}$) in the glass is accordingly preferably at least 0.001 cat.-%, further preferably at least 0.005 cat.-%, more preferably at least 0.008 cat.-% and particularly preferably at least 0.01 cat.-%.

The glass bodies of the invention shall be photo-structurable. This means that they, after exposure to UV-light of a certain wave-length and a subsequent tempering step, can be selectively crystallized and subsequently structured (etched). However, the proportion of cerium in the glass must not be increased at will because thereby indeed the photo-sensitivity would be increased, however also the transmissibility of the UV-light of relevant wave-length would be suppressed. Eventually, for light exposure of the glass body (as in the prior art) UV-light of a wave-length is used, at which $Ce^{3+}$ is absorbing. Thus, if the content of $Ce^{3+}$ in the glass is very high, it cannot be light exposed in any desired depth. This reduces the maximally achievable structure depth. For this reason the content of cerium in the glass is preferably restricted to at most 0.3 cat.-% or at most 0.2 cat.-%, further preferred at most 0.1 cat.-%, more preferred at most 0.05 cat.-% and particularly preferred at most 0.025 cat.-%. In order for the desired effect according to Equation 1 to occur, cerium should be present in the glass in an amount of at least 0.001 cat.-%, in particular at least 0.005 cat.-% and particularly preferred even at least 0.008 cat.-% or 0.01 cat.-%. In the prior art it was tried to achieve the crystallization susceptibility by reduction of the amount of nuclei former. This definitely works, however the photo-sensitivity of the glasses is thereby restricted so much that structuring is strongly impeded.

Preferably, the molar content of nuclei-source in the glass is at least twice as high as the content of cerium, further preferably the molar ratio of nuclei-source to cerium is at least 2.2, more preferably at least 2.5 and particularly preferably at least 3 and in particular at least 4.5. Advantages at crystallization arise from a balanced ratio of nuclei-source, in particular silver, to cerium. At presence of a relatively larger amount of nuclei-source more nuclei are formed, which in turn leads to smaller crystals. The content of cerium relative to nuclei-source is rather small according to the invention because no particularly large amount of this component is necessary for nuclei formation due to the sensitization. However, the indicated ratio of silver to cerium should not exceed a certain value because otherwise the relative amount of cerium is not sufficient for inducing sufficient formation of nuclei.

In special embodiments it may be reasonable to further restrict the ratio of nuclei-source to cerium. This is the case in particular when only a smaller structure depth can be achieved by UV light exposure. An increase in the achievable structure depth can on the one hand indeed be achieved by reduction of the cerium-content as described above. However, it was surprisingly found that also without reduction of the cerium-content an increased structure depth can be achieved if a lower ratio of nuclei-source to cerium is chosen. This can be reasonable in comparison to a reduction of the cerium-content because thereby there is still enough $Ce^{3+}$ available as reducing agent for $Ag^+$ even at a relatively oxidizing melting procedure and consequently a relatively high $Ce^{4+}/Ce^{3+}$ ratio due to the relatively high total content of cerium. In such an embodiment the ratio of nuclei-source to cerium in the glass of the present invention is preferably at most 5.5, further preferably at most 5.2, particularly preferably at most 4.9.

The glass components described herein are not conclusive. Thus, the glass may contain further components not mentioned herein. However, in preferred embodiments with regard to the cations the glass consists to an extent of at least 90 cat.-% of the components mentioned herein. In further preferred embodiments, the glass consists to at least 95 cat.-%, further preferred at least 97 cat.-%, more preferred at least 99 cat.-% of the components mentioned herein. In a particularly preferred embodiment the glass consists to 100 cat.-% of the components discussed herein.

Preferably, the glass is free of molecular hydrogen (H2). Molecular hydrogen can lead to formation of atomic silver and thus to nuclei formation independent of irradiation.

If it is indicated in this description that the glass does not contain a certain component or is free of a certain component, then it is meant that this component is not added to the glass intentionally. This does not exclude that this component is possibly present in the glass as impurity. Impurities shall typically and preferably not exceed a proportion of 0.1% by weight of the glass, further preferred not more than 100 ppm, more preferably not more than 10 ppm, even more preferred not more than 1 ppm shall be present. In a preferred embodiment, the thus indicated components are present in the glass of the invention at most in an amount that is below the detection limit.

A preferable glass comprises the following components in cat.-%:

| | |
|---|---|
| $Si^{4+}$ | 45 to 65 |
| Crystal-agonists | 30 to 45 |
| Crystal-antagonists | 3.5 to 9 |

In a preferred embodiment the glass comprises the following components in cat.-%:

| | |
|---|---|
| $Si^{4+}$ | 45 to 65 |
| Crystal-agonists | |
| $Li^+$ | 25 to 40 |
| $K^+$ | 0 to 8 |
| $Na^+$ | 0 to 8 |
| Crystal-antagonists | |
| $B^{3+}$ | 0 to 5 |
| $Al^{3+}$ | 0 to 10 |
| $Zn^{2+}$ | 0 to 4 |
| $Sb^{3+}$ | 0 to 0.4 |
| Nuclei-source | |
| $Ce^{3+}/Ce^{4+}$ | >0 to 0.3 |
| $Ag^+$ | >0 to 0.5 |

In addition to cations the glass also comprises anions, which are preferably selected from the group consisting of $O^{2-}$, $F^-$, $Br^-$, $Cl^-$ and $SO_4^{2-}$. The molar proportion of $O^{2-}$ with regard to the anions should preferably be at least 50% (anion-%), further preferably at least 70%, more preferably at least 90%, more preferably at least 98% and particularly preferably at least 99%. In a preferred embodiment the glass is entirely oxidic, it thus contains only $O^{2-}$ as anions and is free of other anions.

The glass preferably comprises only small amounts of halides. It is preferred that the content of halides among the anions is restricted to at most 5 anion-%, further preferably at most 3 anion-% and more preferably at most 1 anion-%. Halides are understood according to the invention as the anions of Cl, F and Br. In particular embodiments the glass is free of anions of Cl, F and/or Br or comprises these components in proportions of preferably not more than 3 anion-%, 2 anion-% or 1 anion-% each.

The glass preferably comprises essentially no colloidal silver prior to irradiation with UV-light. The silver preferably present in the glass is in particular present prior to irradiation in form of $Ag^+$ in a proportion of at least 95%, further preferred at least 99%.

The glass should preferably not contain more than 5 cat.-% T$^{4+}$ (titanium). Titanium impairs transmittance of the glasses in the UV region, which negatively affects the achievable structure depth. Preferably, the content of titanium is restricted to at most 3 cat.-%, further preferred at most 1 cat.-%. Preferred embodiments comprise titanium in amounts of less than 0.2 cat.-% or are free of titanium.

The glass is preferably free of components not mentioned herein, in particular of cations of La, Nb, W, Hf, Bi, Y, Yb, Pb, As, Ta, Gd and/or Eu.

It turned out to be advantageous to restrict the content of alkaline earth metal cations in the glass, in particular to up to 10 cat.-%, preferably up to 5 cat.-%, more preferably up to 2 cat.-%. In particularly preferred embodiments the glass comprises at most 1 cat.-% of alkaline earth metal cations or is even free of these. Alkaline earth metal cations are preferably understood according to the invention as $Mg^{2+}$, $Ca^{2+}$, $Ba^{2+}$ and $Sr^{2+}$. In special embodiments the glass is free of $Mg^{2+}$, $Ca^{2+}$, $Ba^{2+}$ and/or $Sr^{2+}$ or comprises these components in proportions of preferably not more than 3 cat.-%, 2 cat.-% or 1 cat.-% each. In particularly preferred embodiments the glass is free of barium.

The glasses of the present invention are either cooled relatively slowly during cooling of the melt or after fast cooling of the melt they are once more heated to a certain temperature T1 and are slowly cooled from there to a temperature T2 in a post-processing step. In the context of this invention we call these alternative process steps "sensitization".

The method of the invention preferably comprises a sensitization step. Sensitization is characterized by the glass being cooled from an initial temperature T1 to a target temperature T2. Thereby the initial temperature T1 is in a range that allows diffusion of ions in the glass to a certain extent, this is a temperature range, which is at least above the glass transition temperature $T_g$ of the glass, in particular at least 25° C. above $T_g$. Thereby the cooling state of the glass is adjusted. Only at reaching the target temperature T2, which is at least 150° C. below T1, the viscosity in the glass is preferably again so high that no further diffusion and no further change of the cooling state of the glass occurs anymore.

In preferred embodiments the initial temperature T1 is at least 400° C., further preferably at least 425° C., more preferably at least 450° C. and particularly preferably at least 475° C. A certain minimum temperature is necessary for enabling the adjustment of the cooling state. Therefore, T1 has to be above $T_g$ of the glass. In preferred embodiments T1 is at least 25° C., further preferred at least 40° C. above $T_g$. However, at too high temperatures the crystallization tendency increases so that a too high temperature T1 may lead to crystallization. Therefore, T1 preferably does not exceed a value of 1000° C., further preferably 800° C., more preferably 600° C. and particularly preferably 550° C. In particularly preferred embodiments is T1=500° C. T1 is preferably below the softening temperature of the glass, in particular at least 100° C. below the softening temperature.

Temperature T2 is at least 150° C. below T1. T2 is preferably below $T_g$ of the glass. In preferred embodiments T2 is at least 20° C., further preferred at least 100° C., more preferred at least 200° C. and particularly preferred at least 220° C. In order that the ion mobility at T2 decreases again to a negligibly small value it is preferred that T2 is at most 400° C., further preferred at most 350° C., more preferred at most 300° C. In a particularly preferred embodiment is T2=240° C.

The preferably performed sensitization leads to the cooling state preferred according to the invention. For that the sensitization comprises cooling of the glass from T1 to T2 either from the melt or as post-processing on a glass body. Accordingly the glass is for example cooled from the melt, if applicable in the mold, to T1 or a glass body is heated to T1. Afterwards, the glass is cooled from T2 to room temperature if applicable.

In an embodiment the glass for the glass body is cooled during sensitization steadily from temperature T1 to T2. "Steadily" means therein that it is cooled continuously from T1 to T2 without maintaining the glass at certain temperature levels. In particular therewith is meant a cooling with essentially constant cooling rate. As far as it is further cooled from T2 to room temperature also this further cooling can occur steadily. Room temperature is preferably 20° C.

In another embodiment the glass passes through different cooling stages during sensitization. Thereby the glass is preferably cooled from temperature T1 to a temperature T1.1, then to a temperature T1.2 and so on. Thereby it is preferred that the glass is cooled via at least 2 intermediate stages, in particular at least 3 and particularly preferred at least 4 intermediate stages to temperature T2. However, preferably it is cooled via at most 7, further preferred at most 6 and particularly preferred at most 5 intermediate stages. In such an embodiment the glass may be cooled by passing through at least one cooling furnace. This enables a continuous processing. Preferably sensitization occurs in such a way that the glass is lead through zones of different temperatures for ensuring the cooling. Therein this way of cooling means optionally but not necessarily that also the temperature of the glass is kept at the temperature of the respective stage. Rather, the temperature of the glass within a temperature stage may slowly adapt to the temperature of this stage and then be moved into the next stage. This may be implemented as a cooling sequence by use of temperature zones on a cooling line.

When passing through different cooling stages, the glass is preferably kept for 10 to 40 minutes at a given temperature stage. The temperature stages preferably have a distance of at least 5° C. and in particular at least 10° C. and in particular at most 50° C. Thereby the glass does not necessarily reach the temperature of the respective stage before it is transferred to the next temperature stage.

The sensitization of the glass may thus occur as a processing step in the method of the invention, the initial temperature T1 is thus then reached by cooling of the glass in the mold or the sensitization takes place as separate post-processing step, as the pressed glass body is re-heated to the initial temperature T1 and then controlledly cooled to T2.

Prior to sensitization the crystallization tendency of the glass of the invention is not so pronounced as after the sensitization.

When sensitization is discussed herein, this always means a processing step that occurs prior to the light exposure of the glass. The heat treatment step after light exposure is herein called "tempering" in agreement with the literature.

The cooling state of the glass is adjusted by the sensitization. Thereby also the density of the glass approaches the density of the underlying crystal system. The glass is getting denser. This relates to both the mass density and the index of refraction. The glasses preferably have a refractive index $n_d$ at 546.1 nm and 25° C. of at least 1.500 and in particular at most 1.600. Furthermore, the glasses preferably have a mass density p of at least 2.35 g/cm$^3$, further preferred at least 2.36 g/cm$^3$. In preferred embodiments the density is less than 2.4 g/cm³ and preferably less than 2.39 g/cm³. High density results in formation of smaller crystallites after light exposure and tempering due to suppressed diffusion of the crystal components, however, the closer the density approaches the density of the crystals, the higher is also the risk of undesired, non-selective crystallization. If not indicated otherwise or automatically evident for the skilled person, measurements herein are performed at a temperature of 25° C. and an air pressure of 101.325 kPa.

The glass has preferably a softening point of at least 600° C., in particular at least 650° C. Preferably, the softening point is at most 750° C. and in particular at most 700° C.

As described above, the glass is melted in a comparably oxidizing way. Thereby the component cerium is also present in its tetravalent oxidation state. However, the tetravalent oxidation state does not participate in the above described reaction (Equation 1) of nuclei formation. It is recognizable that the proportion of cerium in the trivalent oxidation state increases in the glass by the sensitization. $Ce^{3+}$ absorbs at about 314 nm, thus in the UV. In order for the glass to form sufficient nuclei upon light exposure, it is preferred according to the invention, that the glass has a transmittance of not more than 50% at a wavelength of 314 nm and a thickness of 1 mm. If the transmittance at this wavelength is higher than 50%, this may mean that the concentration of $Ce^{3+}$ in the glass is not sufficient for triggering a sufficient formation of nuclei upon light exposure.

Figure 4:
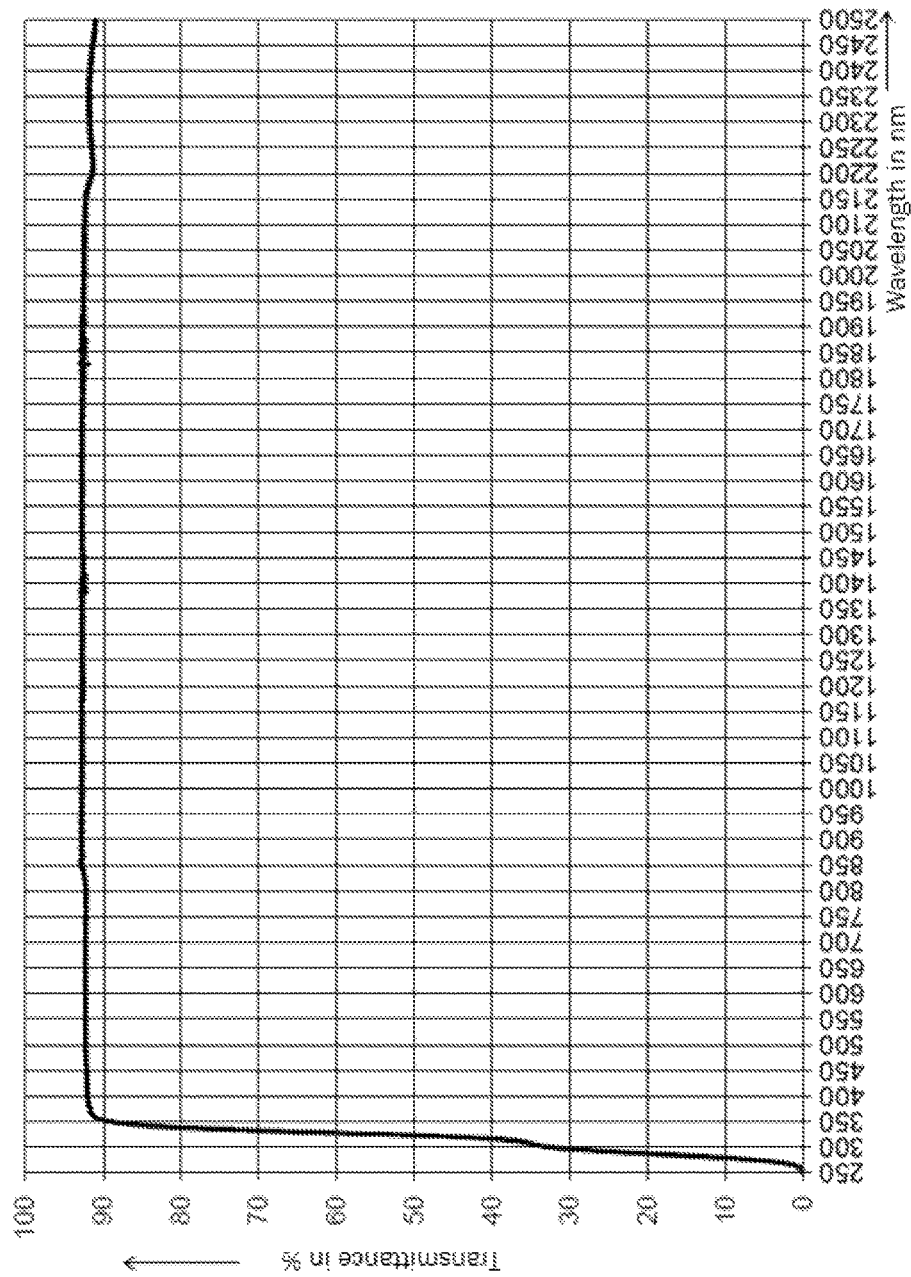
FIG. 4 shows transmittance of an example glass with a thickness of 1 mm in dependence from the wavelength.

Particularly preferably, the transmittance at 314 nm and a thickness of 1 mm is not more than 40%, further preferred not more than 39%. Nevertheless, the absorption at this wavelength should not be too high so that the UV radiation may enter the glass deep enough so that deep structures are achievable. In this respect the transmittance at 314 nm and a thickness of 1 mm should preferably be at least 10%, further preferred at least 20%, more preferred at least 25% or at least 30% and particularly preferred at least 35%. The transmittance is in particular the internal transmittance, thus the transmittance of the glass without influences of reflections. The transmittance of an example glass is shown in FIG. 4 in dependence from the wavelength.

In order for this to be achieved, it is preferred according to the invention, that the amount of cerium in the glass is restricted. The content of cerium should be selected depending on the thickness of the glass body. In preferred embodiments, the content of cerium in the glass is restricted to an amount of at most $4\times10^{-3}$ cat.-% per millimeter glass thickness. Further preferred is a value of at most $3\times10^{-3}$ cat.-% per millimeter glass thickness. However, in order for the amount of cerium being sufficient for triggering the necessary formation of nuclei, a minimum amount of cerium of at least $2\times10^{-3}$ cat.-% per millimeter glass thickness should be set up. Preferably, the glass body of the invention is present with a thickness of at least 1 mm, further preferred at least 3 mm and particularly preferred at least 5 mm. However, the thickness preferably does not exceed a value of 20 mm, further preferably 15 mm. The glass body is preferably a blank out of glass, in particular not a laminate or layer composite assembly. The glass body preferably consists of the glass described herein and in particular not of ceramic or glass-ceramic.

Preferably, the glass bodies of the invention have at their widest site a diameter of at least 4 inch, further preferred at least 5 inch, more preferred at least 6 inch and in particular at least 7 inch. The method of the present invention enables such large geometries in comparison to the prior art. In common methods, the size of the molds was restricted to smaller dimensions because otherwise the cooling could not be done fast enough for avoiding crystallization. Nevertheless, also according to the invention the maximum size is preferably restricted to up to 15 inch, preferably up to 12 inch, particularly preferably up to 10 inch. The mold may be heated in an embodiment for avoiding a too fast quenching of the melt.

It is an advantage of the glasses that they are producible in a continuous production method. Preferably, melting of the mixture occurs in a vessel. From there the glass melt preferably reaches a refining vessel, where a refining step takes place. From the refining vessel the glass melt preferably reaches a crucible, in particular a platinum crucible, which may have a stirrer. The glass melt is homogenized in the crucible. By stirring a particularly high homogeneity can be achieved. From the crucible the melt may be transferred into the mold.

With the continuous production method glasses with particular high homogeneity can be obtained because the occurrence of striae can be reduced drastically. Particularly small fluctuations with regard to the transmittance, the density and the index of refraction result from such high homogeneity. Preferably, the glass is so homogeneous that at a wavelength of 260 nm and/or 280 nm the standard deviation of the transmittance is at most 15%, further preferred at most 10%, further preferred at most 7%, further preferred at most 5%, further preferred at most 4%, further preferred at most 3%, even further preferred at most 2%, particularly preferred at most 1%, even further preferred at most 0.8%, even further preferred at most 0.5%, even further preferred at most 0.4%, even further preferred at most 0.2% of the respective mean value of transmittance, wherein mean value and standard deviation are determined from at most 100, preferably at most 60, further preferred at most 40, further preferred at most 30 independent measured values. Preferably, mean value and standard deviation are determined from at least 5 independent measured values, more preferably from at least 10 independent measured values, more preferably from at least 15 independent measured values. In preferred embodiments, mean value and standard deviation are determined from 50 independent measured values, more preferably from 40 independent measured values. The independent measured values are obtained by measuring transmittance on different positions of the glass. Preferably, the distance between any two neighboring measuring positions is at least 0.1 mm, more preferably at least 0.5 mm, more preferably at least 1 mm, more preferably at least 5 mm, even more preferably at least 10 mm. The skilled person knows how to determine the standard deviation based on a group of measured values. The standard deviation corresponds to the square root of the sum of the squared deviations of the individual measured values from the mean value of the measured values, wherein the sum is divided by the number of measured values minus one prior to square rooting.

The transmittance value at 260 nm and a sample thickness of 1 mm is preferably at least 0.2%, further preferred at least 0.5%, further preferred at least 1%, further preferred at least 1.2%, further preferred at least 1.5%, further preferred at least 1.8%, further preferred at least 2%, further preferred at least 2.5%. Preferably, the transmittance value at 260 nm and a sample thickness of 1 mm is at most 5%, further preferred at most 4%, further preferred at most 3.5%, further preferred at most 3%. The transmittance value a 280 nm and a sample thickness of 1 mm is preferably at least 8%, further preferred at least 9%, further preferred at least 10%, further preferred at least 11%, further preferred at least 12%, further preferred at least 13%, further preferred at least 15%, further preferred at least 16%. Preferably, the transmittance value at 280 nm and a sample thickness of 1 mm is at most 30%, further preferred at most 25%, further preferred at most 20%.

It is remarkable that even at wavelengths of 260 nm and 280 nm preferably such low fluctuations of transmittance can be achieved because this is exactly where the UV-edge is and thus generally higher standard deviations would be expected. Moreover, these wavelengths are at least slightly overlapping with the absorption region of $Ce^{3+}$ so that the small fluctuations of transmittance are a good indicator for the homogeneous distribution within the glass.

Measurement of transmittance can preferably be used for quality testing of the glasses because only small deviations occur in the transmittance values. Furthermore, due to the possibility of improved optical focusing the small fluctuations of the index of refraction preferably enable a light exposure of the glass body not only at its surface or in surface-near regions but also deep inside the glass body via a respectively focused laser. The high homogeneity of the glasses preferably also causes that more homogeneous etching rates are present during the etching process, which in turn may result in more precisely obtainable structures due to a reduction of etching errors. Moreover, by a more homogeneous etching rate preferably also the occurrence of etching-caused striae is reduced. The very low-striae manufacturing facilitates the applicability of the indicated methods.

Due to the production in a continuous process not only the above described homogeneity within a glass piece is increased but also the homogeneity between different batches.

The glass body produced according to the invention can be cut with a cutting process, in particular by sawing, into glass wafers that subsequently may be ground and/or polished. A particularly preferred cutting process is wire-sawing, in particular multi-wire-sawing, for example Multi-Wire-Slice (MWS). Preferred cutting material is steel wire. In preferred embodiments the internal medium between raw glass and steel wire is emery. In such embodiments, the particle size of the internal medium is preferably in the range between 100 and 300 US standard mesh, more preferred in the range between 150 and 250 US standard mesh, more preferred about 200 US standard mesh. Preferably, the cutting speed is in the range between 2 and 20 mm/hour, more preferred between 4 and 15 mm/hour, even more preferred between 6 and 10 mm/hour. If the cutting speed is very low, cutting is not very efficient. If the cutting speed is very high, the glass may break or the cutting wire may be torn apart.

Preferably, the cut glass wafers, optionally after grinding and polishing, have total thickness variations (TTV) of at most 30 µm, further preferred at most 20 µm, further preferred at most 15 µm, further preferred at most 10 µm, further preferred at most 8 µm, further preferred at most 5 µm in an area of 325 $cm^2$. Of course, the indicated TTV is preferably all the more reached in smaller areas, as for example in an area of 180 $cm^2$.

For adjusting the redox state of the glass melt the used raw materials are important. The following list indicates the respectively preferably used raw materials for adjusting suitable melting conditions. However, the skilled person knows also other measures for adjusting the redox state.

In addition to the raw materials also other measures may be applied for adjusting the redox distribution of the melt. For example, in an embodiment of the invention oxidizing gases may be conducted into the melt (bubbling). Furthermore, the temperature of the melt is important for the redox state. In particular, high melting temperatures result in reducing melting conditions.

| Glass component | Preferred raw material |
|---|---|
| $Si^{4+}$ | Sand |
| | Crystal-agonists |
| $Li^+$ | Lithium carbonate |
| $K^+$ | Potash |
| $Na^+$ | Soda, sodium sulfate, sodium antimonate |
| | Crystal-antagonists |
| $B^{3+}$ | Boron trioxide |
| $Al^{3+}$ | Aluminum hydroxide |
| $Zn^{2+}$ | Zinc oxide |
| $Sb^{3+}$ | Sodium hexahydroxidoantimonate |
| | Nuclei-former |
| $Ce^{3+}/Ce^{4+}$ | Cerium oxide |
| $Ag^+$ | Silver oxide, silver nitrate |

Depending on the desired composition of anions in the glass, also the respective halides may be used. It is however preferred according to the invention that the glasses comprise as little proportions of halides as possible.

The invention also comprises a method for photo-structuring a glass body of the invention. The method of photo-structuring comprises in particular the steps of light exposure and structuring of the glass body, which comprises the glass described herein and in particular consists thereof. The light exposure preferably occurs at a wavelength, which essentially corresponds to the absorption maximum of $Ce^{3+}$ in the glass. This wavelength is in the UV, in particular in the region between 300 nm and 320 nm, in particular at 310 nm. During light exposure, regions that are not to be light exposed are preferably covered with a mask.

The dose of UV light exposure has to be high enough for ensuring a sufficient photo-structuring. The UV light exposure preferably takes place with a dose of more than 0.1 $J/cm^2$. Further preferred the dose is at least 1 $J/cm^2$, further preferred at least 3 $J/cm^2$, further preferred at least 5 $J/cm^2$, further preferred at least 7 $J/cm^2$, even further preferred at least 10 $J/cm^2$. However, the dose should also not be too high. Preferably, the dose is at most 100 $J/cm^2$, further preferred at most 50 $J/cm^2$, even further preferred at most 25 $J/cm^2$.

Preferably the light exposure time, which is necessary for a sufficient crystallization at a dose preferred according to the invention, is at most 20 minutes, further preferred at most 15 minutes, further preferred at most 10 minutes, further preferred at most 5 minutes.

In a preferred embodiment the light exposure takes place with a laser. Preferably, the laser is a pulsed laser. Preferably, the laser is a nanosecond-laser, further preferred a picosecond-laser, even further preferred a femtosecond-laser. Multi-photon absorption enables working with long wavelength in the visible range or more preferred even in IR-range, at which ranges the glass has a particular high transmittance so that it can be light exposed in great depths. The excitation of components in the UV-region, as for example $Ce^{3+}$, occurs in such embodiments preferably very predominantly in the regions onto which the laser is focused. Very particularly preferably, the laser is a titanium:sapphire-femtosecond-laser. Light exposure with a laser preferably additionally enables generation of particularly fine structures and/or structures being particularly deep inside the glass body in the subsequent etching step.

The high homogeneity of the glasses produced according to the method of the present invention, in particular with regard to the transmittance and to the index of refraction, preferably enables a light exposure also in great depths within the glass body. The light exposure preferably occurs with a focused short-pulse laser or with a UV-source, for example a UV-lamp or a UV-burner. Preferably, the light exposure depth is at least 0.5 mm, further preferred at least 1 mm, further preferred at least 2 mm, further preferred at least 5 mm, further preferred at least 10 mm, further preferred at least 15 mm, further preferred at least 20 mm. Preferably, the light exposure depth is even up to 50 mm, further preferred up to 100 mm, further preferred up to 200 mm, further preferred up to 300 mm, further preferred up to 500 mm, further preferred up to 1000 mm, even further preferred up to 2500 mm. However, it has to be considered that the focus of the short-pulse laser is getting longer or blurred with increasing light exposure depth. Therefore, light exposure with a focused short-pulse laser should also not occur in too great depth. The light exposure depth is preferably determined via the depth of the light exposure dependent crystallization. The measurement is conducted for the side view. The glass body is exposed on its entire surface with the UV illumination. Then the glass body is tempered in order to crystallize the exposed parts. Then the sample is cut in half, and the cleaved part is inspected from the side. Preferably, immersion oil is used in order to avoid the necessity of polishing the cleaved surface. The exposure depth is then measured with a microscope. The border of crystallization can clearly be seen by this method.

Particularly preferably undercut structures may be generated. For this, preferably different UV-lasers are used, which differ with regard to the entering depth into the glass body. Hence, it can be light exposed in different depths with different doses. Because the actual structuring occurs in a subsequent etching step, preferably already two, further preferably even a single round of light exposure is sufficient so that high velocities of light exposure of preferably at least 1 m/s, more preferably at least 5 m/s, even more preferably at least 10 m/s can be achieved. Preferably, a wafer can be processed in less than 12 hours, more preferred less than 6 hours, more preferred less than 3 hours, more preferred less than 2 hours, more preferred less than 1 hour. By stepwise ceramization of an already structured element, preferably also predetermined breaking points can be generated.

The structuring of the light exposed glass body preferably occurs via etching, in particular with an HF-containing etching solution. The concentration of HF in the etching solution is preferably between 5% and 20% by weight in water. Particularly preferably the concentration of HF in the etching solution is 10% by weight. By the structuring structured glass bodies are obtained, which in comparison to the prior art have a better, at least however an equivalent structure with respect to the structure depth and to the aspect ratio.

The structure depth in the structured glass bodies, which are available with the glass according to the invention, is preferably up to 0.1 mm, further preferred up to 0.2 mm, more preferred up to 0.5 mm, more preferred up to 1 mm, more preferred up to 2 mm, more preferred up to 3 mm, even more preferred up to 4 mm, very particularly preferred up to 5 mm. "Structure depth" is understood according to the invention as the height difference in the direction of etching between a crystallized region and a non-crystallized region.

"Aspect ratio" is understood according to the present invention as the ration between the depth of a structure and its width. Of course it is preferable when large aspect ratios are possible. With the glass of the present invention aspect ratios of up to 80 to 1, preferably up to 60 to 1, more preferably up to 50 to 1 and particularly preferably up to 40 to 1 can be achieved. Preferably the achievable aspect ratio is at least 10 to 1, further preferred at least 15 to 1, further preferred at least 20 to 1.

The transmittance of the glass at the wavelength of light exposure should be as high as possible so that particularly large structure depths can be achieved. Therefore, the above indicated parameters with regard to transmittance should be observed when large structure depth is desired. For the transmittance at the wavelength of light exposure the amount of $Ce^{3+}$ is important among others.

After light exposure and prior to structuring the glass bodies to be structured are preferably tempered. Tempering serves for inducing crystal formation around the nuclei formed during light exposure. For this purpose the glass body to be structured is heated to a temperature, which enables formation of crystals and which is in particular above the glass transition temperature of the glass. This temperature is preferably at least 400° C., further preferred at least 455° C., further preferred at least 500° C., further preferred at least 550° C. Furthermore, this temperature should preferably not exceed a value of 650° C., further preferred 600° C. and particularly preferred 580° C. Very particularly preferred this temperature is in a range of from 555° C. to 565° C., even more preferred the temperature is 560° C. Even though the etching ratio may be higher at high temperatures, the indicated preferred tempering temperatures are nonetheless preferred because crystallization may occur to a larger extend also in areas that were not light exposed in case the tempering temperature is very high. Furthermore, a certain holding time in this temperature range should be observed so that sufficient crystals of the desired size may form. The holding time is preferably at least 10 minutes. Generally not enough crystals form at a too low temperature or a too short holding time and the crystal growth is too strongly pronounced at too high temperature or too long holding time so that particular large crystals are obtained. Large crystals are disadvantageous because they lead to the structured surface having a comparably high roughness. Thus, small crystals are preferred. Particularly preferably, after the etching process the surface has a roughness Ra of less than 1000 nm, further preferred less than 100 nm, further preferred less than 50 nm, further preferred less than 20 nm, further preferred less than 10 nm, further preferred less than 5 nm, further preferred less than 3 nm, further preferred less than 1 nm. Preferably, the roughness is measured with a tactile profilometer. Particularly preferably, the roughness is measured with a Dektak XT™ stylus profiler by BRUKER.

The etching rate describes the removal from the surface of the glass body by the etching solution. The unit of the etching rate is μm/min. Structuring of the surface is achieved by the etching rate being higher in the regions that have before been light exposed with UV radiation than in the unexposed regions. Preferably, the etching rate in the unexposed regions is at most 5 μm/min, more preferably at most 2 μm/min, more preferably at most 1 μm/min, even more preferably at most 0.5 μm/min. In the light exposed regions the etching rate is preferably at least 10 μm/min, more preferably at least 20 μm/min, more preferably at least 30 μm/min, more preferably at least 40 μm/min, even more preferably at least 50 μm/min.

The etching ratio is the ratio of the etching rate in the light exposed regions to the etching rate in the unexposed regions. Preferably, the etching ratio is at least 10 to 1, more preferably at least 20 to 1, more preferably at least 30 to 1, more preferably at least 40 to 1, even more preferably at least 50 to 1.

Due to the preferred sensitization of the glass according to the present invention in particular very pronounced crystal phases are formed. Indeed in the light exposed regions it is not a pure ceramic but a mixture of glass and crystals (glass-ceramic). However, the proportion of crystals in this glass-ceramic phase is particularly high according to the invention. In the crystallized glass body of the present invention the proportion of crystals in the glass-ceramic phase is preferably at least 10 vol.-%, further preferred at least 20 vol.-%, more preferred at least 40 vol.-% and particularly preferred at least 60 vol.-%. However, the proportion of crystals in the glass-ceramic phase is smaller than 100 vol.-%.

In one embodiment of the method of the invention for structuring of glass bodies, glass bodies are used, which have been formed before in the hot forming method of the invention. Such methods are known to the skilled person. However, they could not be performed with photo-structurable glasses of the prior art because all of these methods have to be performed at temperatures, which favor a crystallization of the glass. However, the glass used herein can be subjected to a hot forming process in an "insensitive" state and can be sensitized only subsequently. During hot forming the crystallization tendency of the glasses of the invention is not so pronounced that crystallization occurs. Only upon sensitization, which is described further above, the crystallization tendency is increased in such a way that photo-structuring becomes possible.

Consequently, a method preferred according to the invention comprises initially melting the glass, subsequently hot forming, sensitization of the glass during hot forming or subsequently, and subsequently the structuring as described above.

A structured glass body, which has excellent properties with regard to durability, structure depth, aspect ratio and internal quality, is then obtained from the glass.

Particularly preferred structures are through holes. Through holes are holes that extend through the entire thickness of a glass body. Preferably, through holes have an essentially cylindrical shape, wherein the height of the cylinder corresponds to the thickness of the glass body. The diameter of a through hole is the largest distance of opposing rims of the hole when measured perpendicular to the height axis of the hole. The shape of the through holes may deviate from the cylindrical shape. For example, the through holes may have essentially cuboid shape. However, in any case the diameter of the through hole is defined as the largest distance of opposing rims of the hole when measured perpendicular to the height axis of the hole. Preferably, the through hole diameter is determined microscopically. In a preferred embodiment through holes with a diameter of at most 500 µm, further preferred at most 250 µm, further preferred at most 100 µm, further preferred of at most 50 µm, further preferred at most 35 µm, further preferred at most 30 µm, even further preferred at most 20 µm, even further preferred at most 10 µm can be obtained. Preferably, holes can be obtained, which are so close to each other that the distance of their centers has a value of at most 1.5-times the hole-diameter. Further preferably the distance is even only at most 1.3-times, further preferred at most 1.2-times, even further preferred at most 1.1-times the hole-diameter. Preferably, holes can be generated with such a precision that at a designed hole-diameter of 30 µm and a glass thickness of 500 µm the deviations from the designed hole-diameter are at most 30 µm, more preferably at most 15 µm, more preferably at most 10 µm, more preferably at most 5 µm, more preferably at most 2 µm, more preferably at most 1 µm, even more preferably at most 0.5 µm. Due to such a precision also the deviations of the diameter of individual through holes in a glass body of the invention at a designed hole-diameter of 30 µm and a glass thickness of 500 µm is preferably at most 30 µm, more preferably at most 15 µm, more preferably at most 10 µm, more preferably at most 5 µm, more preferably at most 2 µm, more preferably at most 1 µm, even more preferably at most 0.5 µm. Preferably, through holes with so low deviations from the designed hole-diameter may be obtained that the standard deviation from the designed hole-diameter is at most 5 µm, further preferably at most 3 µm, further preferably at most 2 µm, further preferably at most 1 µm, further preferably at most 0.5 µm, further preferably at most 0.2 µm, even further preferably at most 0.1 µm. Furthermore, at a designed hole-diameter of 30 µm and a glass thickness of 500 µm preferably through holes can be obtained, whose slope angle is smaller than 5°, more preferably smaller than 2°, even more preferably smaller than 1°, particularly preferably smaller than 0.5°. The slope angle describes the deviation of the longitudinal direction of the through holes from the perpendicular to the surface of the glass bodies.

A glass body manufactured according to the invention can be cut with a cutting process, in particular via sawing, into glass wafers, which may subsequently be ground and polished. Such glass wafers preferably have a thickness, which is at most 10 mm, further preferred at most 5 mm, more preferred at most 2 mm, more preferred at most 1 mm and particularly preferred at most 500 µm, more preferred at most 300 µm.

The glasses of the invention can be applied in the field of micro-fluidics. For example, samples can be analyzed inside the photo-structured glass bodies. For this purpose it is advantageous when the glasses have a good transmissibility to infrared radiation. Using infrared radiation, different qualitative and quantitative microscopic detections can be performed. It is preferred according to the invention that the glasses of this invention have at a wavelength of 900 nm and a thickness of 1 cm a transmission of at least 70%.

Furthermore, the glasses are preferably also transparent in the region of visible light from 400 to 800 nm. This means preferably that the internal transmittance of the glass in the entire wavelength region from 400 nm to 800 nm at a thickness of 1 cm is always at least 85%, more preferred at least 90% and particularly preferred at least 95%.

The glass bodies of the present invention may be used structured and/or unstructured in different applications. Preferred in accordance with the invention is the use in components or as components in micro-technology, in micro-reaction-technology, in electronic packaging, for micro-fluidic components, in or as FED spacer, for bio-technology (for example titer plates), as interposer, in or as three-dimensional structurable antennae.

Preferably, glass bodies of the present invention may be used as substrates or glass circuit boards (GCB) in the fields of microfluidics/biotechnology, for example Lab-on-chip/Organ-on-chip, Micro Mixers, Micro Reactor, Printer head, Titer plates, Chip electrophoresis, semiconductors, for example Logic/Integrated Circuits, Memory, Contact Image Sensor, Field emission display (FED) spacer, Integrated Passive Device (IPD), Capacitors, Inductors, Resistors, sensors, for example Flow-/temperature-sensors, Gyroscopes/Accelerometers, radio frequency micro-electromechanical systems (RF/MEMS), for example Antenna, Capacitor, Filter/duplexer, Switches, Oscillator, Telecommunication for example Optic alignment chips, Opticalwaveguides, Optical interconnects.

In accordance with the invention is also the use of the glass body of the invention in a method for production of a structured glass body.

The following table shows the compositions in cat.-% of glasses used according to the invention. All of the presented glasses are oxidic, which means the proportion of anions that are not oxygen is at most 2 anion-%.

TABLE 1

EXAMPLE GLASSES IN CAT.-%

| Component | B1 | B2 | B3 | B4 | B5 |
|---|---|---|---|---|---|
| $Si^{4+}$ | 59.6 | 52.1 | 60.4 | 53 | 60.1 |
| $K^+$ | 3.8 | 5.6 | 3.4 | 3.78 | 4.08 |
| $Na^+$ | 2.5 | 2.8 | 0.15 | 3.79 | 2.51 |
| $Ag^+$ | 0.06 | 0.06 | 0.004 | 0.044 | 0.043 |
| $B^{3+}$ | 0.26 | 0.94 | 0 | 0 | 0 |
| $Al^{3+}$ | 3.8 | 5.14 | 4.27 | 6.05 | 3.86 |
| $Li^+$ | 29.2 | 32.2 | 31.4 | 33.3 | 28.8 |
| $\Sigma(Ce^{4+}, Ce^{3+})$ | 0.011 | 0.01 | 0.003 | 0.007 | 0.005 |
| $Zn^{2+}$ | 0.56 | 1.07 | 0.27 | 0 | 0.54 |
| $Sb^{3+}$ | 0.17 | 0.12 | 0.07 | 0.118 | 0.13 |
| Sum of the components | 99.96 | 100.04 | 99.97 | 100.09 | 100.07 |
| $Li^+/Si^{4+}$ | 0.49 | 0.62 | 0.52 | 0.63 | 0.48 |
| $\Sigma(Li^+, Na^+, K^+)$ | 35.5 | 40.6 | 34.95 | 40.9 | 35.4 |
| $\Sigma(Li^+, Na^+, K^+)/Si^{4+}$ | 0.6 | 0.78 | 0.58 | 0.77 | 0.59 |
| $\Sigma(B^{3+}, Al^{3+}, Zn^{2+})$ | 4.6 | 7.2 | 4.5 | 6.1 | 4.4 |
| $Ag^+/\Sigma(Ce^{4+}, Ce^{3+})$ | 5.45 | 6 | 1.33 | 6.3 | 8.6 |

Example 1

By pressing of the glass B1 in a mold a glass body with a thickness of 15 mm was produced. Thereby the melt was cooled down in the mold in such a way that the temperature range between 990° C. and 600° C. was passed through within 11 minutes. By subsequent sensitization the glass was adjusted to a cooling state, which corresponds to a cooling from 500° C. to 240° C. with an average cooling rate of 80° C./h. The glass was sawed, ground and polished and thus adjusted to a thickness of 0.5 mm. At different positions of the glass the transmittance was measured at a wavelength of 280 nm. 40 measurements were performed and the mean value of the transmittance was at 30%. The glass was so homogeneous that the standard deviation of the transmittance was only about 0.4% of the mean value of transmittance.

The glass body was light exposed with UV-light, which had a dose of 10 J/cm² at 320 nm. For generation of through holes with a diameter of 40 μm and a distance of the hole-centers of 60 μm, the regions not to be exposed were covered with a mask. Subsequently, the glass body was tempered at a temperature of 580° C. for one hour. The etching step was done in a 10% HF-solution at room temperature. The etching ratio was 47 to 1. Through holes with an average diameter of approximately 40 μm were obtained, wherein the standard deviation of the hole-diameter was less than 1 μm.

Example 2

A glass body was produced and light exposed as described in example 1. However, the tempering temperature was varied for investigating its influence on the etching rate. The highest etching ratio is obtained at a tempering temperature of 580° C.

Example 3

A glass body was produced and processed as described in example 1. However, the designed hole-diameter was varied. It turned out that the standard deviation is independent from the designed hole-diameter.

Example 4

By pressing of glass B2 in a mold a glass body with a thickness of 45 mm was produced. Thereby the melt was cooled down in the mold in such a way that the temperature range between 990° C. and 600° C. was passed through within 8 minutes. By subsequent sensitization the glass was adjusted to a cooling state, which corresponds to a cooling from 550° C. to 300° C. with a cooling rate of 40° C./h. The glass was so homogeneous that at 50 measurements at a wavelength of 280 nm the standard deviation of the transmittance was only about 0.5% of the respective transmittance value.

The glass body was light exposed with an IR-femtosecond laser with a wavelength of 960 nm. The dose was 0.2 J/cm². The glass was so homogeneous that a focusing was possible in a depth of 20 mm. After 90 minutes of etching glass bodies with two entrance openings with a diameter of 500 μm and a depth of 20 mm each were obtained, which were connected by a channel with a diameter of 100 μm, which extended in a depth of 20 mm from one entrance-hole to the other entrance-hole.

Example 5

A glass body of the invention was divided into several pieces so that several samples were obtained. Some of the samples remained untreated and served as comparative examples, while other samples were subjected to a sensitization step. An increase in the transmittance at 280 nm was detected in the sensitized samples in comparison to the non-sensitized comparative examples. It was found that the increase in transmittance positively correlated with the level of the temperature T1 during sensitization.

Example 6

In order to determine the influence of antimony on the transmittance properties, two glasses of the invention were compared, which differed only with regard to the antimony-content. This was 0.15 cat.-% and 0.2 cat.-%, respectively. Transmittance was 1.2% at a wavelength of 260 nm at a 1 mm thick glass body with the higher antimony-content. In contrast it was surprisingly found that transmission at 260 nm at a 1 mm thick glass body with the lower antimony-content was 1.9%. By this increase of transmittance in the UV-region the light exposure time required for sufficient crystallization was reduced from 14 minutes in the glass with the higher antimony-content to 5 minutes in the glass with the lower antimony-content. At thicker glass bodies there was also an increase in the achievable structure depth from 1.7 mm in the glass with high antimony-content to 3 mm in the glass with the lower antimony-content.

FIG. 1 shows the cooling curve of glass B1.

FIG. 2 shows a cooling curve with logarithmically plotted x-axis.

Figure 3:
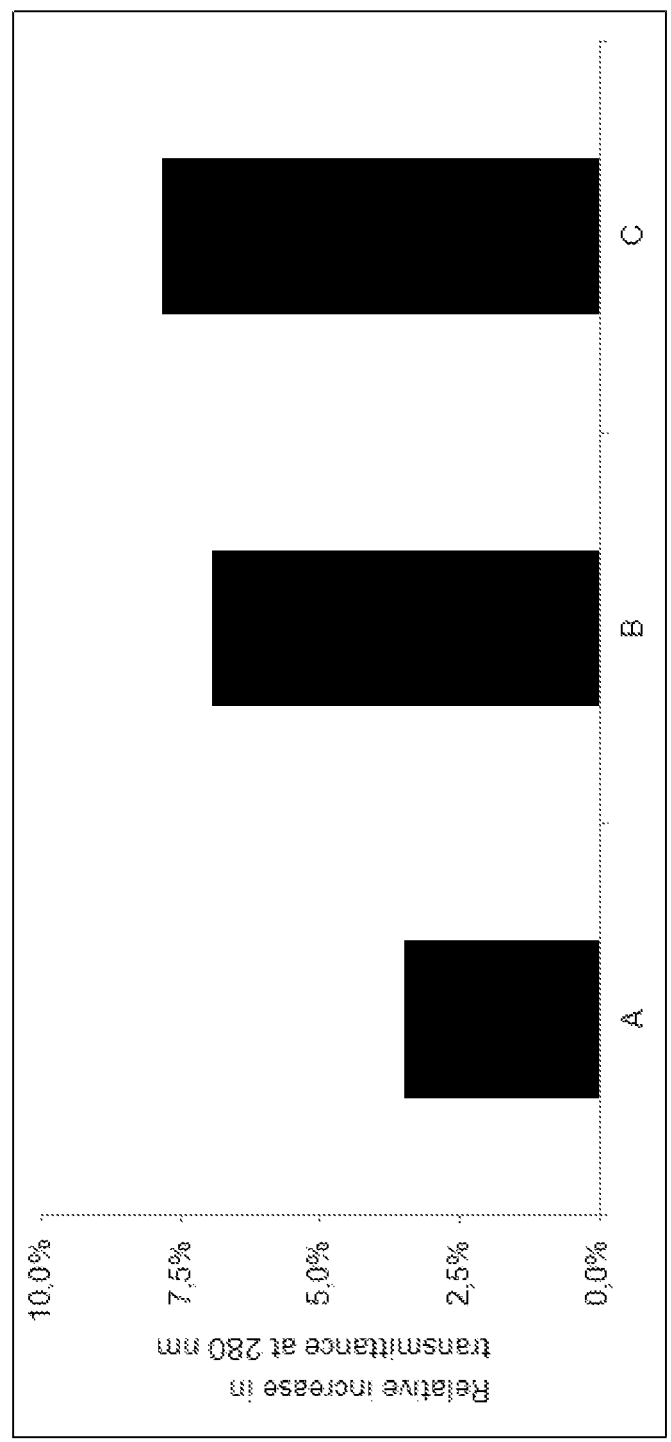
FIG. 3 shows the influence of sensitization of an example glass on the transmittance in the UV-region.

FIG. 3 shows the influence of sensitization of an example glass on the transmittance in the UV-region. Transmittance at 280 nm was measured at a sample thickness of 1 mm. The relative increase in transmittance is shown for the sensitized samples A to C in comparison to a non-sensitized comparative sample. Samples A to C differ with regard to the temperature during sensitization. Temperature T1 was lower in sample A than in sample B and in sample B lower than in sample C. It is evident that the increase in transmittance at 280 nm is more pronounced with increasing temperature T1.

FIG. 4 shows transmittance of an example glass with a thickness of 1 mm in dependence from the wavelength.

Figure 5:
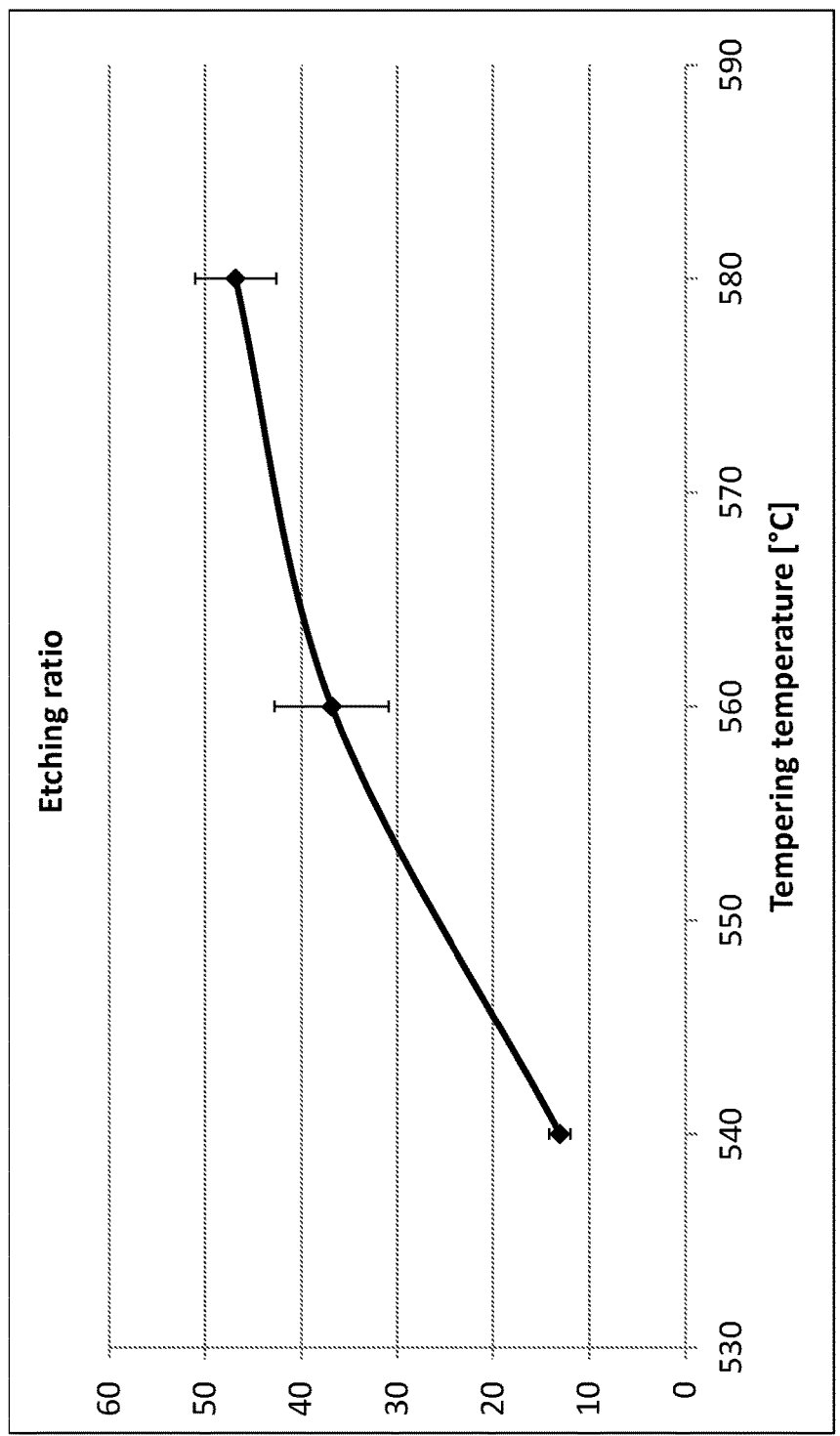
FIG. 5 shows the dependence of the achieved etching ratio from the tempering temperature.

FIG. 5 shows the dependence of the achieved etching ratio from the tempering temperature. On the x-axis the tempering temperature and on the y-axis the achieved etching ratio is shown. The highest etching ratio is obtained at a tempering temperature of 580° C.

Figure 6:
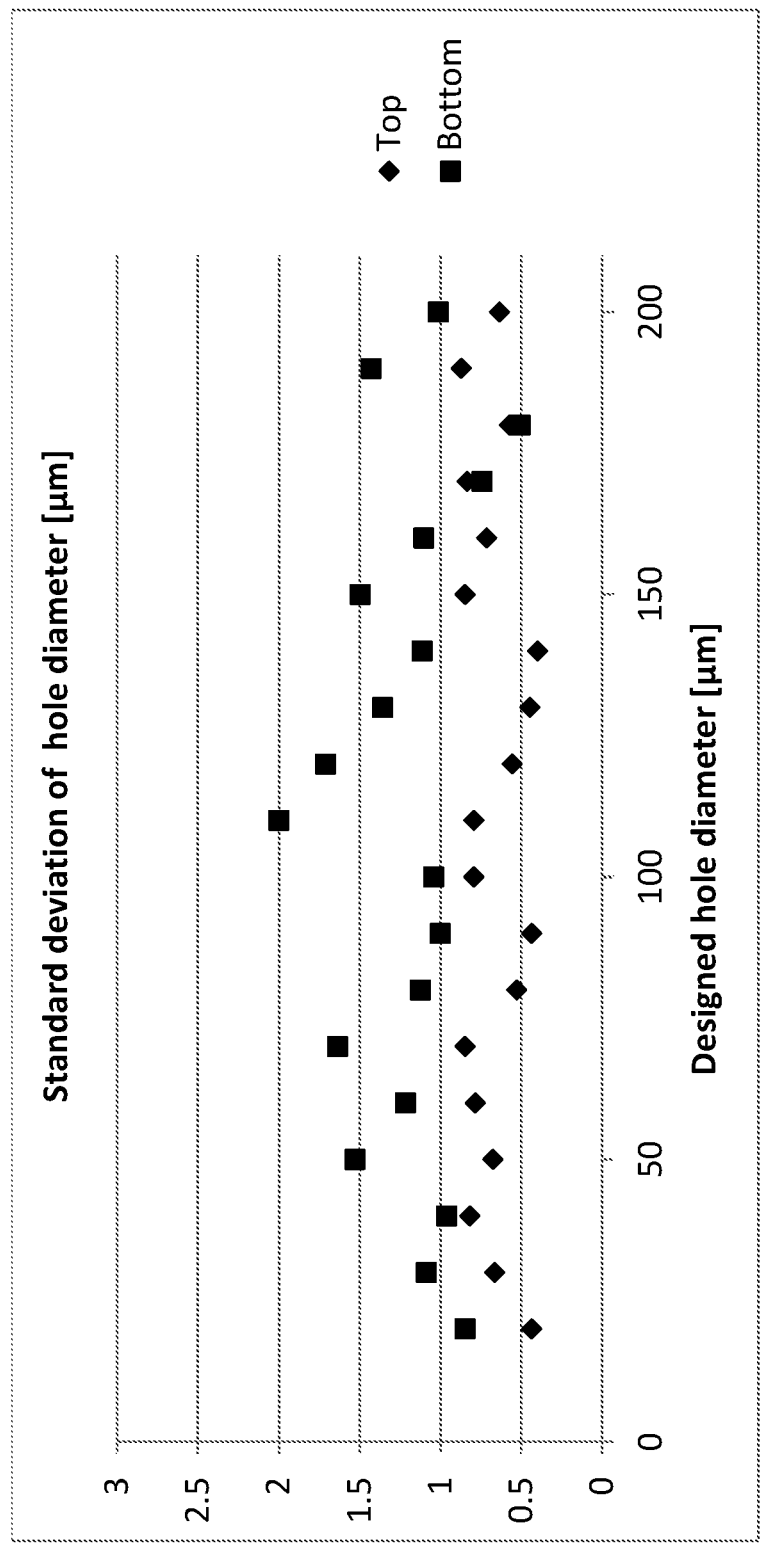
FIG. 6 shows the standard deviation of the obtained hole-diameter in dependence from the designed hole-diameter.

FIG. 6 shows the standard deviation of the obtained hole-diameter in dependence from the designed hole-diameter. The standard deviations are shown both for the top side (diamonds) and the down side (squares) of the through holes. The standard deviation (in µm) is shown on the y-axis. The designed hole-diameter is shown on the x-axis. The results show that the standard deviation is independent of the designed hole-diameter.

What is claimed is:

1. A method of production of a photo-sensitive glass body, comprising the steps of:
    providing a mixture of raw materials for a glass;
    melting the mixture into a melt;
    transferring the melt into a mold; and
    pressing the melt in the mold to a glass body,
    wherein the melt at the time of transferring it into the mold has a temperature above 1000° C.,
    wherein the melt cools down in the mold in such a way that a temperature range of 990° C. to 600° C. is passed through in a time span of less than 15 minutes,
    wherein the glass comprises $Si^{4+}$, a crystal-agonist, a crystal-antagonist, and a pair of nucleating agents,
    wherein the crystal-agonist is selected from the group consisting of $Na^+$, $K^+$, $Li^+$, and any combinations thereof,
    wherein the crystal-antagonist is selected from the group consisting of $Al^{3+}$, $B^{3+}$, $Zn^{2+}$, $Sn^{2+}$, $Sb^{3+}$, and any combinations thereof,
    wherein the pair of nucleating agents comprises cerium and an agent selected from the group consisting of silver, gold, copper, any combinations thereof, and
    wherein the crystal-agonist has a molar proportion in cat.-% in relation to a molar proportion of $Si^{4+}$ of at least 0.3 and at most 0.85,
    the method further comprising the step of subjecting the melt to a sensitization step comprising cooling from a first temperature to a second temperature with an average cooling rate K of 10° C./h to 200° C./h, wherein the first temperature is at least above a glass transition temperature of the glass and the second temperature is at least 150° C. below the first temperature.

2. The method according to claim 1, wherein the step of subjecting the melt to the sensitization step is subsequent to the melting step.

3. The method according to claim 1, wherein the step of subjecting the melt to the sensitization step is subsequent to the transferring step.

4. The method according to claim 1, wherein the glass comprises the following components in cat.-%

| | |
|---|---|
| $Si^{4+}$ | 45 to 65 |
| Crystal-agonists | 30 to 45 |
| Crystal-antagonists | 3.5 to 9. |

5. The method according to claim 1, wherein the glass has the following components in cat.-%

| | |
|---|---|
| $Si^{4+}$ | 45 to 65 |
| Crystal-agonists | |
| $Li^+$ | 25 to 40 |
| $K^+$ | 0 to 8 |
| $Na^+$ | 0 to 8 |
| Crystal-antagonists | |
| $B^{3+}$ | 0 to 5 |
| $Al^{3+}$ | 0 to 10 |
| $Zn^{2+}$ | 0 to 4 |
| $Sb^{3+}$ | 0 to 0.4 |
| Nucleating agents | |
| $Ce^{3+}/Ce^{4+}$ | >0 to 0.3 |
| $Ag^+$ | >0 to 0.5. |

6. The method according to claim 1, wherein the glass contains between 0.02 and 0.2 cat.-% $Sb^{3+}$.

7. The method according to claim 1, wherein the glass comprises anions and cations and a molar proportion of $O^{2-}$ with regard to the anions of at least 99%.

8. The method according to claim 1, wherein the sensitization step comprises cooling from a first temperature to a second temperature with an average cooling rate K of 20° C./h to 200° C./h.

9. The method according to claim 8, wherein the sensitization step comprises cooling from a first temperature to a second temperature with an average cooling rate K of 20° C./h to 150° C./h.

10. The method according to claim 1, wherein the sensitization step comprises cooling from a first temperature to a second temperature with an average cooling rate K of 60° C./h to 200° C./h.

\* \* \* \* \*